US010253593B2

(12) United States Patent
Hopper et al.

(10) Patent No.: US 10,253,593 B2
(45) Date of Patent: Apr. 9, 2019

(54) VALVE ASSEMBLY

(71) Applicant: Cameron International Corporation, Houston, TX (US)

(72) Inventors: Hans Paul Hopper, Aberdeen (GB); Fergal Finn, Ardee (IE)

(73) Assignee: Cameron International Corporation, Houston, TX (US)

( * ) Notice: Subject to any disclaimer, the term of this patent is extended or adjusted under 35 U.S.C. 154(b) by 78 days.

(21) Appl. No.: 14/972,016

(22) Filed: Dec. 16, 2015

(65) Prior Publication Data
US 2016/0186869 A1    Jun. 30, 2016

(30) Foreign Application Priority Data

Dec. 24, 2014    (GB) .................................. 1423192.2

(51) Int. Cl.
*E21B 34/02* (2006.01)
*E21B 43/34* (2006.01)
(Continued)

(52) U.S. Cl.
CPC .............. *E21B 34/02* (2013.01); *E21B 34/04* (2013.01); *E21B 43/34* (2013.01); *E21B 43/36* (2013.01); *B01D 17/047* (2013.01); *F16K 17/168* (2013.01)

(58) Field of Classification Search
CPC ....... B01D 17/047; E21B 43/36; E21B 34/04; E21B 43/34; E21B 34/02; F16K 17/168
See application file for complete search history.

(56) References Cited

U.S. PATENT DOCUMENTS

| 2,105,681 A | 1/1938 | Armstrong |
| 2,233,077 A | 2/1941 | Gillespie et al. |
| (Continued) | | |

FOREIGN PATENT DOCUMENTS

| DE | 3515925 A1 | 11/1986 |
| DE | 3615432 A1 | 11/1987 |
| (Continued) | | |

OTHER PUBLICATIONS

PCT International Search Report and Written Opinion; Application No. PCT/US2015/066509; dated Aug. 1, 2016; 17 pages.
(Continued)

*Primary Examiner* — Matthew W Jellett
*Assistant Examiner* — Christopher Ballman
(74) *Attorney, Agent, or Firm* — Fletcher Yoder, P.C.

(57) ABSTRACT

A valve assembly is provided, the valve assembly comprising a valve housing; an inlet for fluid entering the valve housing; an outlet for fluid leaving the valve housing; a flow control assembly disposed within the valve housing between the inlet and the outlet, whereby fluid entering the valve housing is caused to flow through the flow control assembly, the flow control assembly comprising a cage having apertures therethrough to provide passage for fluid passing from the inlet to the outlet; a closure assembly having a first closure member disposed within the cage and moveable with respect to the cage between a first closed position, in which the first closure member closes the innermost end of all of the apertures in the cage, and a second open position, in which the innermost end of all the apertures in the cage are open; and a second closure member disposed outside the cage and moveable with respect to the cage between a first closed position, in which the second closure member closes the outermost end of all of the apertures in the cage, and a (Continued)

second open position, in which the outermost end of all the apertures in the cage are open.

31 Claims, 12 Drawing Sheets

(51) Int. Cl.
*E21B 43/36* (2006.01)
*E21B 34/04* (2006.01)
*F16K 17/168* (2006.01)
*B01D 17/04* (2006.01)

(56) References Cited

U.S. PATENT DOCUMENTS

| | | | | |
|---|---|---|---|---|
| 2,598,187 | A * | 5/1952 | Meyer | F16K 25/04 251/126 |
| 3,200,842 | A * | 8/1965 | Wilson | F16K 1/20 137/614.11 |
| 3,572,382 | A | 3/1971 | Luthe | |
| 3,780,767 | A | 12/1973 | Borg et al. | |
| 3,813,079 | A | 5/1974 | Baumann et al. | |
| 3,821,968 | A | 7/1974 | Barb | |
| 3,971,415 | A | 7/1976 | Foller | |
| 4,041,982 | A | 8/1977 | Lindner | |
| 4,384,592 | A | 5/1983 | Ng | |
| 4,557,463 | A * | 12/1985 | Tripp | F16K 1/44 137/630.19 |
| 4,569,370 | A * | 2/1986 | Witt | F16K 3/26 137/625.3 |
| 4,617,963 | A | 10/1986 | Stares | |
| 4,671,321 | A | 6/1987 | Paetzel et al. | |
| 4,848,472 | A * | 7/1989 | Hopper | E21B 33/0355 166/339 |
| 5,005,605 | A * | 4/1991 | Kueffer | F01D 17/145 137/625.39 |
| 5,018,703 | A * | 5/1991 | Goode | F16K 47/08 137/625.3 |
| 5,086,808 | A * | 2/1992 | Pettus | E21B 34/02 137/625.3 |
| 5,236,014 | A | 8/1993 | Buls et al. | |
| 5,431,188 | A * | 7/1995 | Cove | E21B 34/02 137/625.3 |
| 5,964,248 | A | 10/1999 | Enarson et al. | |
| 6,505,646 | B1 * | 1/2003 | Singleton | F16K 47/08 137/625.3 |
| 6,637,452 | B1 | 10/2003 | Alman | |
| 6,782,920 | B2 | 8/2004 | Steinke | |
| 6,851,658 | B2 | 2/2005 | Fitzgerald et al. | |
| 6,997,211 | B2 | 2/2006 | Alman et al. | |
| 7,789,105 | B2 * | 9/2010 | Zecchi | F16K 47/08 137/625.33 |
| 8,371,333 | B2 * | 2/2013 | Bohaychuk | F16K 3/26 137/625.33 |
| 8,490,652 | B2 * | 7/2013 | Bohaychuk | F16K 3/24 137/375 |
| 8,522,887 | B1 * | 9/2013 | Madison | E21B 34/14 137/625.49 |
| 9,458,941 | B2 * | 10/2016 | Bohaychuk | F16K 3/246 |
| 2002/0017327 | A1 | 2/2002 | Kawaai et al. | |
| 2003/0024580 | A1 | 2/2003 | Bohaychuk | |
| 2003/0226600 | A1 | 12/2003 | Stares et al. | |
| 2005/0006150 | A1 | 1/2005 | Sims et al. | |
| 2007/0240774 | A1 | 10/2007 | McCarty | |
| 2009/0026395 | A1 * | 1/2009 | Perrault | F16K 47/08 251/127 |
| 2010/0288389 | A1 | 11/2010 | Hopper et al. | |
| 2012/0227813 | A1 * | 9/2012 | Meek | B01D 17/0217 137/1 |
| 2012/0285546 | A1 | 11/2012 | Ter Haar et al. | |
| 2016/0186891 | A1 | 6/2016 | Hopper | |
| 2016/0186892 | A1 | 6/2016 | Hopper et al. | |

FOREIGN PATENT DOCUMENTS

| | | |
|---|---|---|
| DE | 3717128 A1 | 12/1988 |
| EP | 1278979 A1 | 1/2003 |
| EP | 2042684 A1 | 4/2009 |
| EP | 2042685 A1 | 4/2009 |
| GB | 2462879 A | 3/2010 |

OTHER PUBLICATIONS

PCT Invitation to Pay Additional Fees and International Search Report; Application No. PCT/US2015/066509; dated May 9, 2016; 7 pages.
PCT Invitation to Pay Additional Fees; Application No. PCT/US2015/066493; dated Apr. 22, 2016; 9 pages.
PCT International Search Report and Written Opinion; Application No. PCT/US2015/066493; dated Jul. 25, 2016; 20 pages.
GB Examination Report of Application No. GB1423203.7 dated Mar. 24, 2017; 2 pages.
PCT International Search Report and Written Opinion; Application No. PCT/US2015/066507; dated Jun. 1, 2016; 15 pages.
PCT International Search Report and Written Opinion; Application No. PCT/US2015/066500; dated May 9, 2016; 14 pages.

* cited by examiner

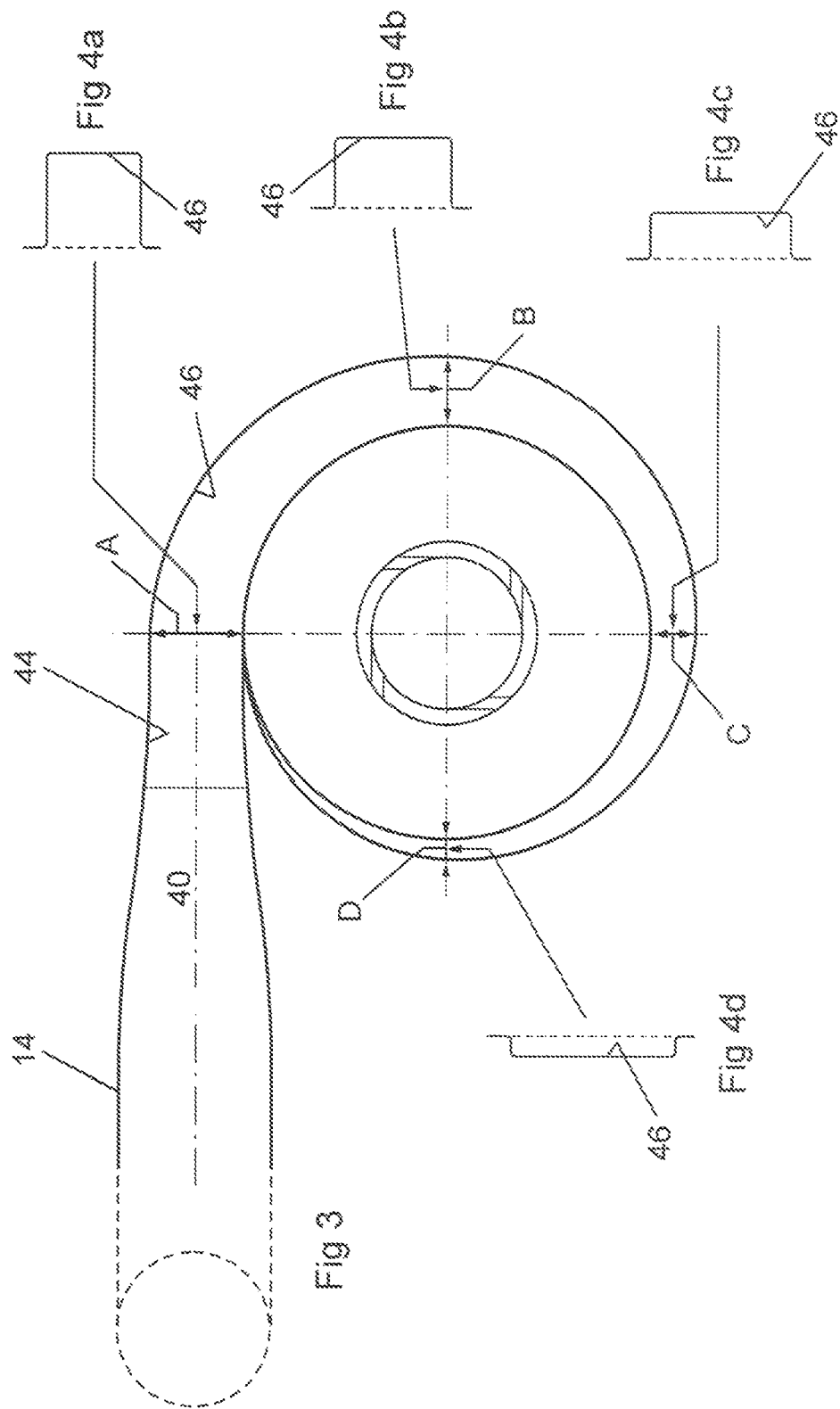

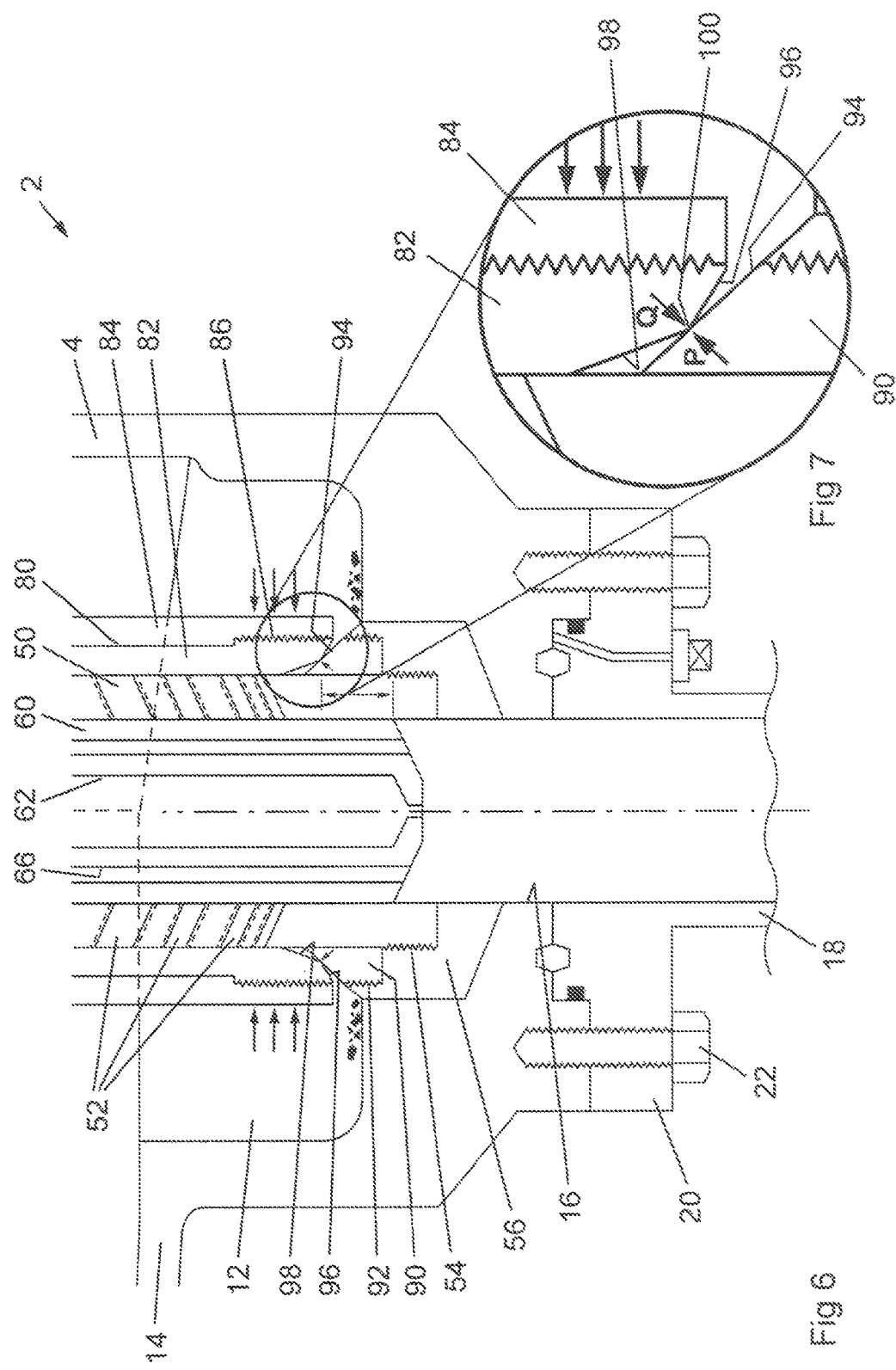

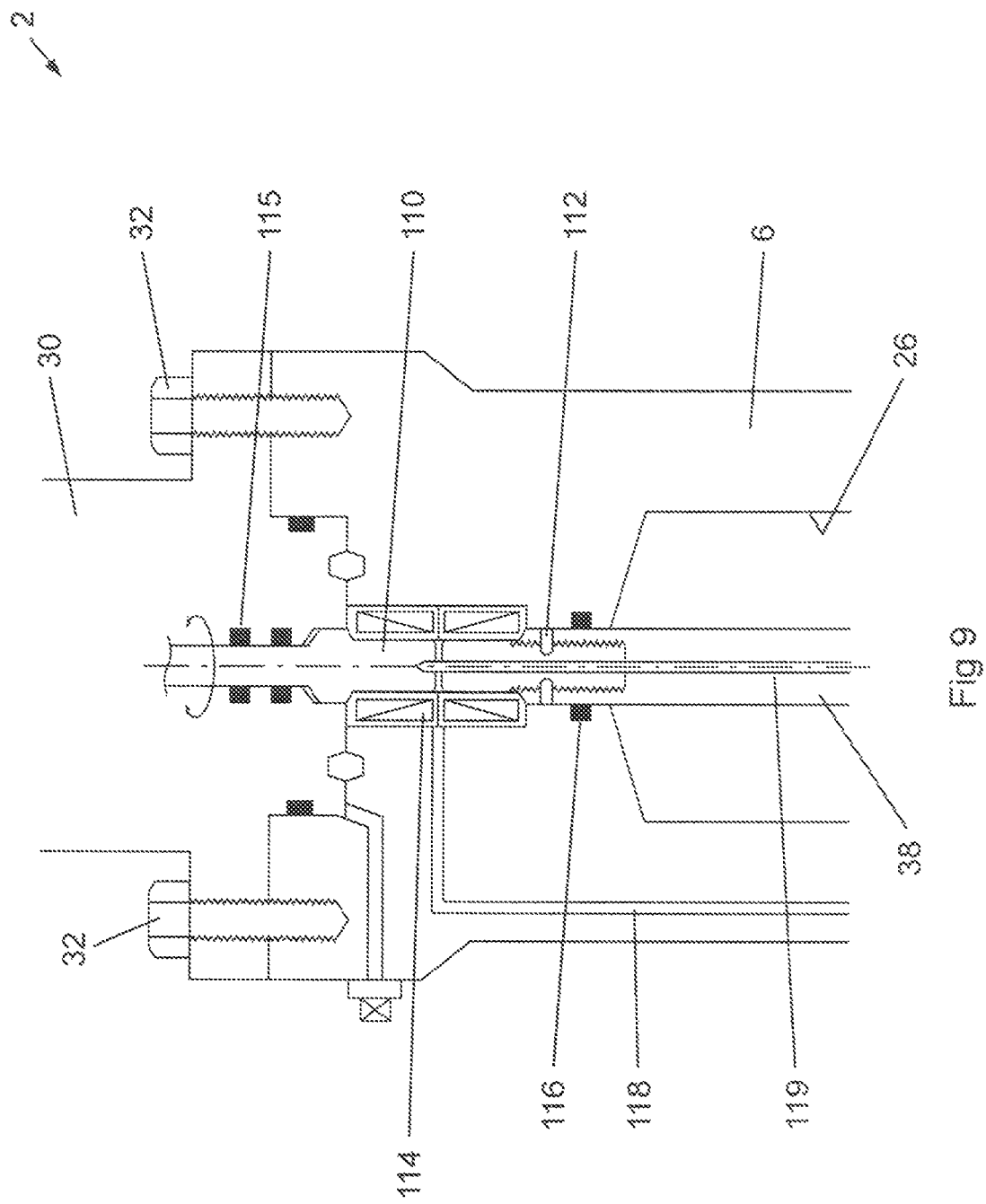

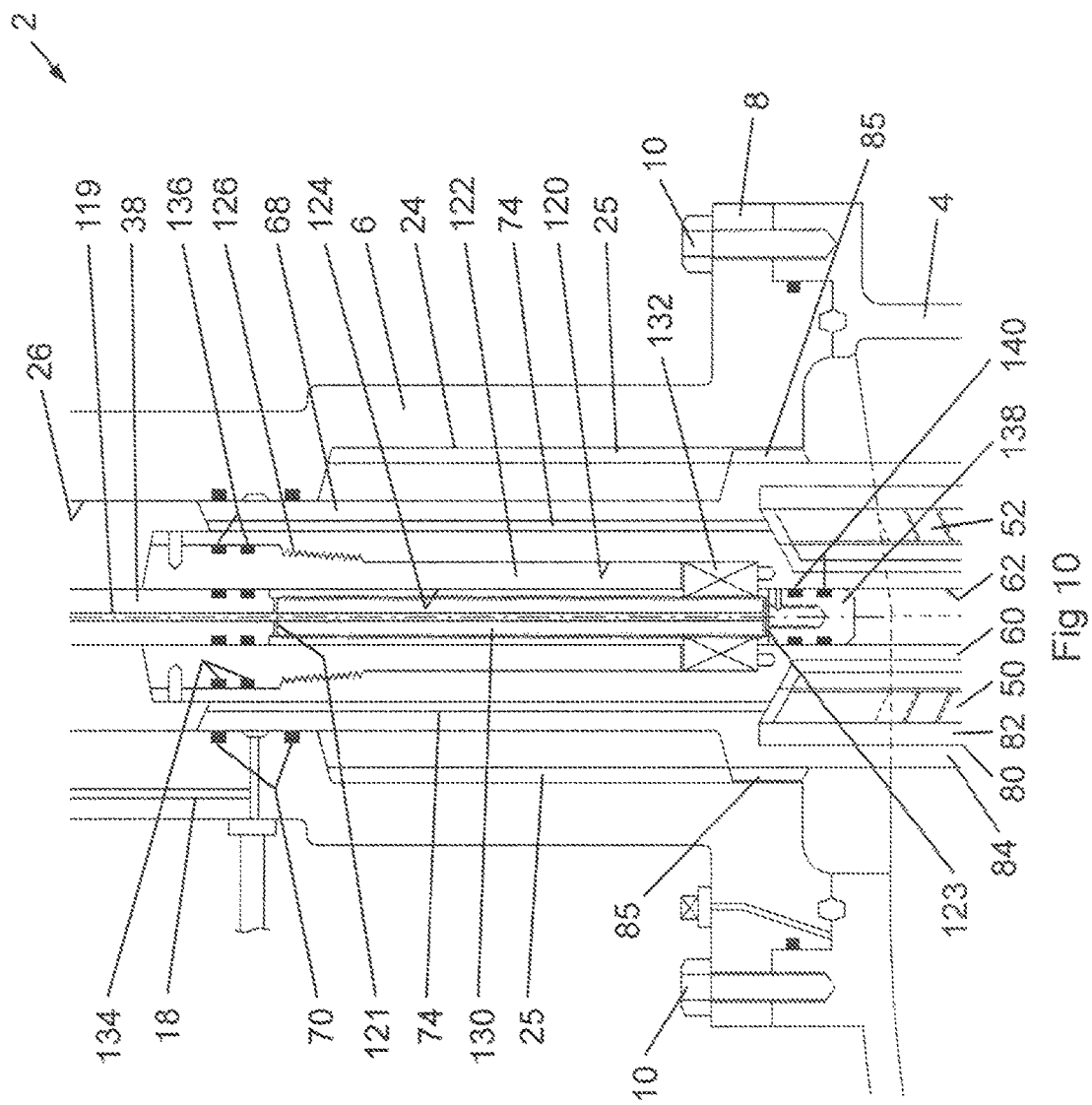

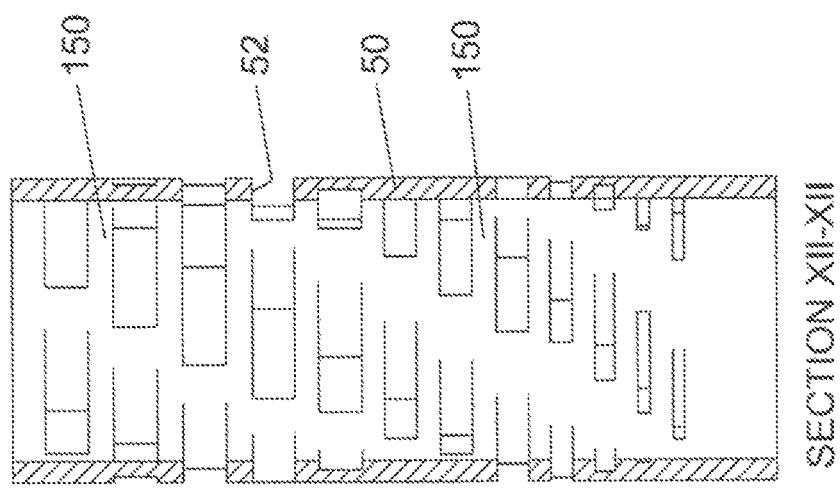
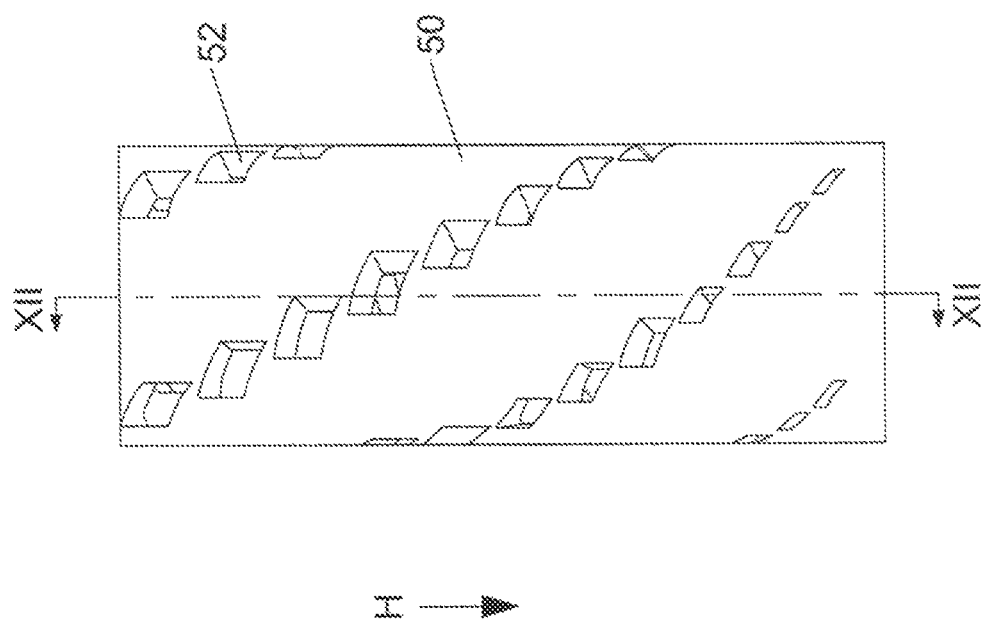

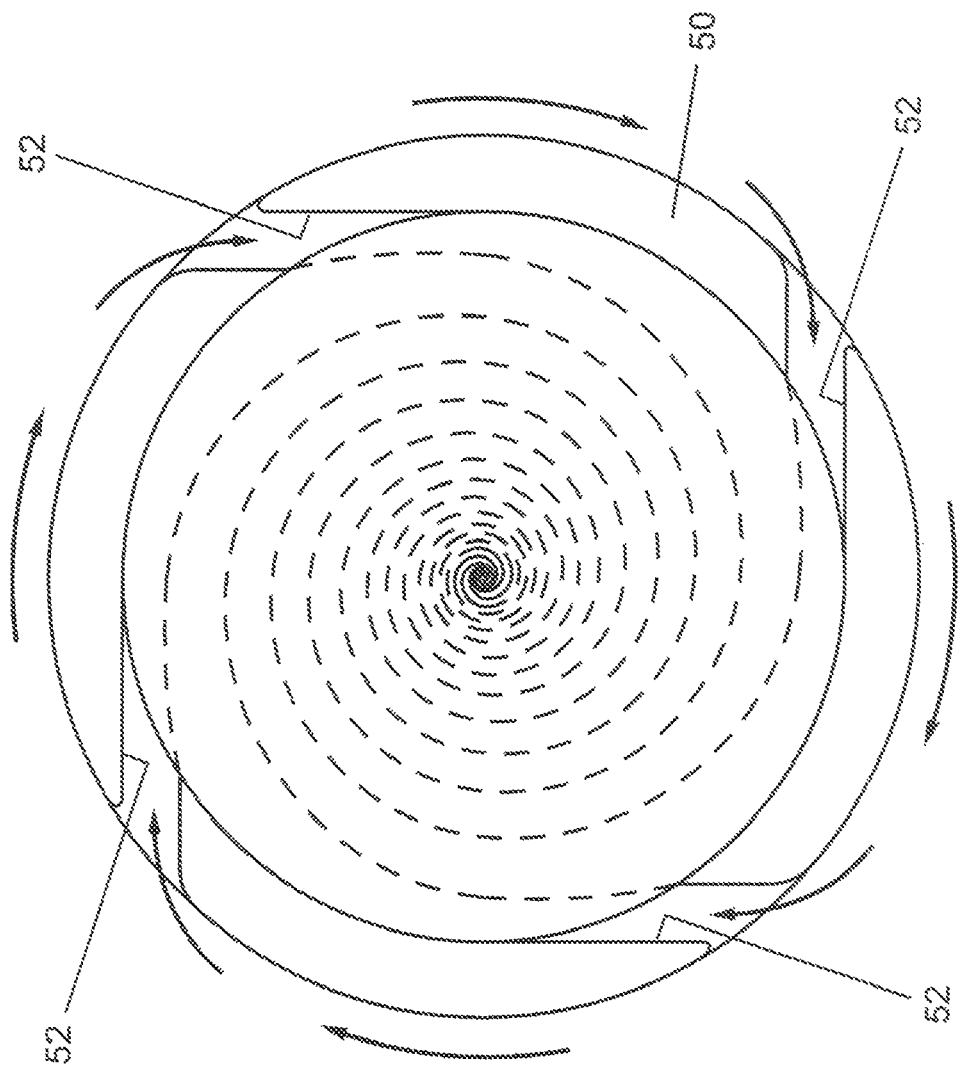

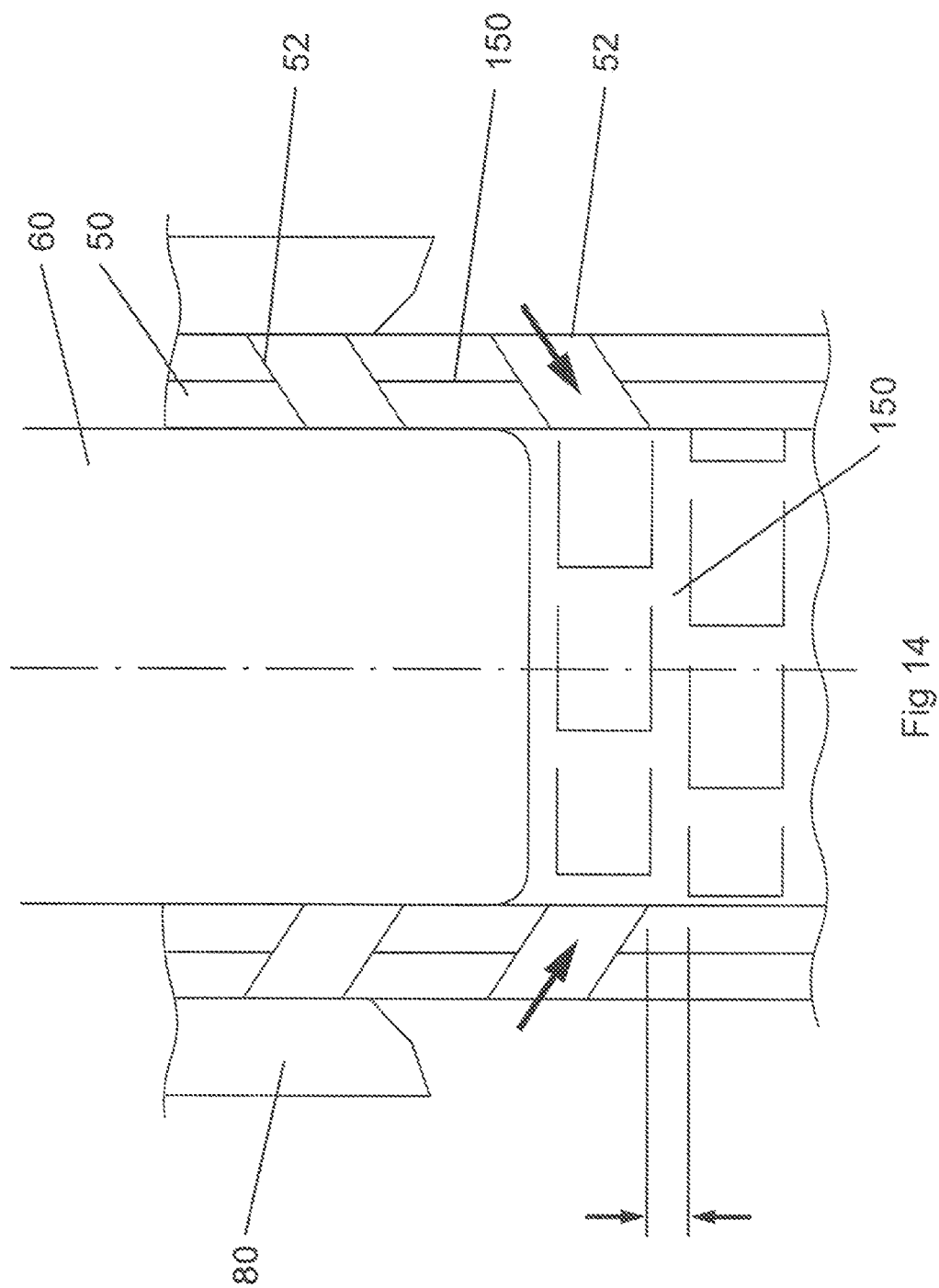

VALVE ASSEMBLY

CROSS REFERENCE TO RELATED APPLICATION

This application claims priority to and benefit of Great Britain Application No. GB1423192.2, entitled "VALVE ASSEMBLY", filed Dec. 24, 2014, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The present invention relates to a valve assembly, in particular to a shut-off flow valve assembly. The valve assembly of the present invention finds particular use in wellhead assemblies and the control of fluids produced from subterranean wells, in particular in subsea locations, for production and process control.

Conventional and known valve assemblies may be divided into several categories. Chokes are widely used to control or adjust the pressure of a fluid stream. For example, generally wellhead assemblies will comprise one or more chokes to reduce the pressure of fluids produced from the well, in order to match the pressure of the fluid downstream of the choke and wellhead assembly to the requirements of the downstream systems and installations. Chokes are typically characterized by being slow acting and providing little or no flow shut-off capabilities. Accordingly, chokes must be used in conjunction with other valve assemblies in order to provide a capability of shutting off the flow of fluid completely, for example when it is needed to isolate the production of fluids from a well. A very common design of choke is the so-called 'plug and cage' arrangement or the so-called 'sleeve and cage' arrangement, in which the pressure of the fluid stream is adjusted by causing the fluid to flow through apertures in a generally cylindrical cage. A plug or sleeve is disposed either inside or outside the cage and is moveable longitudinally with respect to the cage, to reveal or close apertures in the cage in order to achieve the desired pressure of fluid downstream of the choke assembly.

Valves of differing designs and operating principles are also known. For example gate valves and ball valves are known. These forms of valve are known for use in isolating or directing fluid flow and are generally operated between a fully open position and a fully closed position. They offer some ability to control the flow of fluid between the fully open flowrate and zero flow achieved with the valve in the fully closed position. However, they are generally only operated at relatively low pressure differentials. Gate valves and ball valves are generally only operated where no significant pressure differential exists between the fluid upstream and downstream of the valve. An alternative form of valve is the butterfly valve, generally also operated in a fully open or fully closed position, to control fluid flow. As butterfly valves are generally efficient only at low pressures, they are seldom used in wellhead installations, where a valve must be able to cope with being exposed to fluid at full wellhead pressure.

Check valves are used to allow fluid flow in a given direction, typically once a predetermined threshold pressure has been achieved, but to prevent the flow of fluids in the reverse direction. Various designs of check valve are known and operated, including ball check valves, diaphragm check valves and swing check valves. However, these valves are generally not suitable for use as shut-off valves to prevent fluid flow.

There is a need for an improved valve assembly, in particular for use in the control of fluids produced from a subterranean well, for example from a wellhead into a production and processing assembly.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 3 is a diagrammatical cross-sectional view of the lower housing of the valve assembly along the line III-III of FIG. 2;

FIGS. 4a, 4b, 4c and 4d are diagrammatical cross-sectional views of the channel in the inner wall of the lower housing of the valve assembly of FIG. 2, at the positions A, B, C and D respectively of FIG. 3;

FIG. 6 is a cross-sectional view of a portion of the flow control assembly of FIG. 1 in the fully closed position;

FIG. 7 is an enlarged cross-sectional view of the seating arrangement of the flow control assembly shown in FIG. 6;

FIG. 9 is a detailed cross-sectional view of the assembly of FIG. 1, showing a first portion of the actuator mechanism;

FIG. 10 is a detailed cross-sectional view of the assembly of FIG. 1, showing a second portion of the actuator mechanism;

FIG. 11 is a perspective side view of the cage of the assembly of FIG. 1;

FIG. 12 is a vertical cross-sectional view of the cage of FIG. 11 along the line XII-XII;

FIG. 13 is a horizontal cross-sectional representation of fluid flow through the cage of FIG. 11;

FIG. 14 is a cross-sectional representation showing the relationship of the plug within the cage and the apertures through the cage of the assembly of FIG. 1.

DETAILED DESCRIPTION OF SPECIFIC EMBODIMENTS

Figure 1:
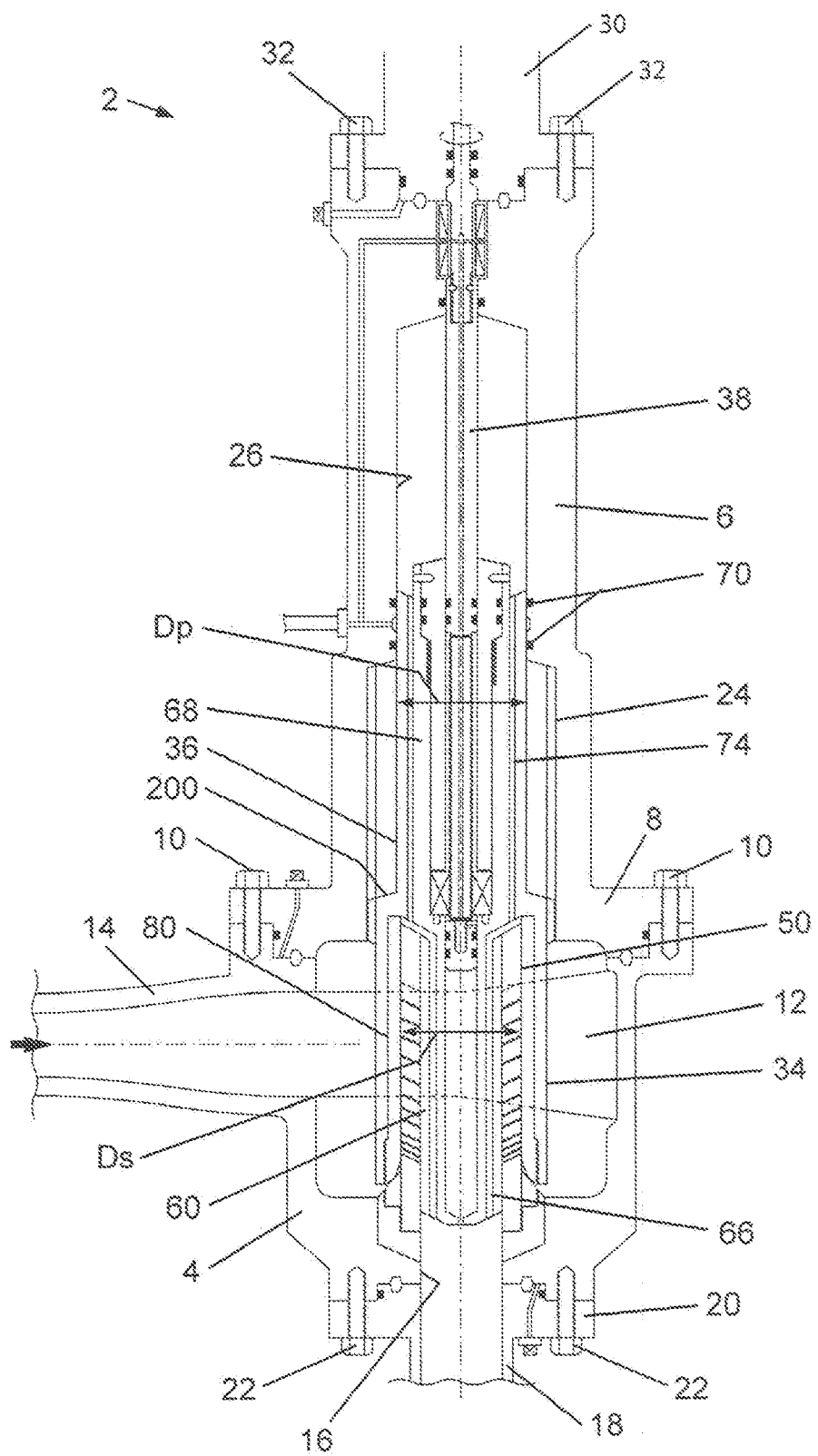
FIG. 1 is a cross-sectional view of a valve assembly according to a first embodiment of the present invention.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Fluids are produced from subterranean wells at high pressures. Fluids, such as gas and oil, together with fluids introduced into the well during drilling and completion operations, such as water and muds, can be produced from the well at pressures up to 10,000 psi and higher. Accordingly, the control of fluids produced from a well represents a significant task for a valve assembly, which must be able to operate in a very harsh environment. Currently, industry practice is to use a pressure isolating valve in combination with a pressure controlling valve. Such an installation is complex and costly to install and maintain.

It would be most advantageous if a valve assembly could be provided for a production or process system, which may be used to control both the pressure of a fluid stream and/or the flowrate of the fluid stream, depending upon the operational requirements of the valve. In addition, it would be most useful if the valve assembly could offer a reliable shut-off capability, that is reduce fluid flow through the valve to zero without fluid leakage past the valve or a risk of failure of the valve. For a production or process application, the valve must be able to contain high fluid pressures, for example above 10,000 psi, and also operate under a high pressure flow differential across the valve, for example a pressure drop across the valve of 3,000 psi or higher.

In terms of operation, the valve assembly should allow for controlled acceleration and deceleration of the valve member, in order to allow the valve member to be slowed when nearing its set position, in order to reduce the risk of hydraulic hammerlock burst effects caused by the sudden stopping of a fast acting valve member. In addition, however, the valve assembly should be fast acting, with a time from fully open to fully closed off from 3 to 5 seconds being highly desirable. Further, the valve assembly should provide a high cycle rate, for example at least 5 cycles/min. Finally, the valve assembly should be robust and durable, with a possible 5 million cycles between services being highly desirable. This feature is particularly important for valves installed in production, process and other installations in remote locations, such as at depth on the seabed, where regular or frequent maintenance of the valve assembly is not feasible.

The present invention provides an improved design of valve for the control of fluid flow. The valve assembly of the present invention finds particular use in the control of fluids produced from subterranean wells, especially use near a wellhead assembly. The reliability of the valve assembly is such that it may be used near wellhead assemblies in remote and/or hard to reach locations, such as production or process installations on the seabed. The flow control valve allows accurate control of fluid flow from a fully closed position through to a fully open position, with a minimum of pressure loss and a minimum of fluid shear.

In a first aspect, the present invention provides a valve assembly comprising:
a valve housing;
an inlet for fluid entering the valve housing;
an outlet for fluid leaving the valve housing;
a flow control assembly disposed within the valve housing between the inlet and the outlet, whereby fluid entering the valve housing is caused to flow through the flow control assembly, the flow control assembly comprising:
a cage having apertures therethrough to provide passage for fluid passing from the inlet to the outlet;
a closure assembly having:
a first closure member disposed within the cage and moveable with respect to the cage between a first closed position, in which the first closure member closes the innermost end of all of the apertures in the cage, and a second open position, in which the innermost end of all the apertures in the cage are open; and
a second closure member disposed outside the cage and moveable with respect to the cage between a first closed position, in which the second closure member closes the outermost end of all of the apertures in the cage, and a second open position, in which the outermost end of all the apertures in the cage are open.

The valve assembly comprises a housing having an inlet for fluid and an outlet for fluid, with a flow control assembly disposed within the housing between the fluid inlet and fluid outlet. In one preferred arrangement, the valve assembly is arranged whereby all the fluid entering the housing through the inlet is caused to flow through the flow control assembly to the fluid outlet.

In a preferred arrangement, the housing comprises a cavity therein, the flow control assembly being disposed within the cavity, preferably centrally, such that the cavity extends around the flow control assembly. In this way, fluid entering through the fluid inlet in the housing is caused to flow around the flow control assembly and enter the cage evenly from the cavity. In a preferred arrangement, to assist the even distribution of fluid within the cavity, the fluid inlet is arranged in the housing to extend tangentially to the walls of the cavity. It has been found that such an arrangement having a tangential entry provides an improved fluid control when using the sleeve/cage arrangement of the valve assembly of the present invention. In particular, by directing incoming fluid into the cavity at an angle, the direct impact of the fluid onto the portion of the flow control assembly facing the inlet is avoided. This prevents premature wear and failure of the flow control assembly, in particular in the case of an erosive fluid stream, such as one containing entrained solid particles, such as may be produced from a subterranean well from time to time. In addition, by having the fluid stream directed in the cavity around the flow control assembly, a more even flow of fluid through the flow control assembly is obtained, in turn improving the control of the fluid flowrate and/or pressure.

In a particularly preferred arrangement, the inlet has the form of an opening in the wall of the cavity, disposed to direct fluid into a channel or groove having the form of an involute and extending around the outer wall of the cavity. The channel or groove is formed to have a progressively smaller cross-sectional area, in order to progressively introduce fluid into the cavity around the flow control assembly. In this way, an even distribution of fluid around the flow control assembly is obtained.

As noted, the valve assembly comprises an inlet and an outlet for fluid to enter and leave the valve housing. Between the inlet and the outlet is disposed a flow control assembly, operable to control the flow rate and/or pressure of fluid passing through the valve. The flow control assembly comprises a cage having apertures therethrough, through which fluid is caused to flow. The apertures are opened and closed as described hereafter. The control of the flow of fluid is obtained by selecting the number and/or size of apertures that are open for fluid passage. The cage may have any suitable form, but is preferably in the form of a generally cylindrical tube, with apertures extending through the wall of the tube.

The apertures may extend through the wall of the cage and be arranged around the cage in any suitable pattern. Known patterns for the apertures include overlapping rows of apertures of different sizes. In one preferred arrangement, the apertures are arranged in a plurality of rows, each row containing one or more apertures, with adjacent rows being separated by a land or region having no apertures therethrough. This arrangement improves the accuracy of the control of fluid flow, by allowing a plug or sleeve to lie with its end face extending across the land, thereby leaving the apertures either fully open or fully closed, depending upon their position relative to the plug or sleeve. In addition, the option of having the end face of the plug or sleeve in a position where it does not extend across a partially open aperture allows the end face of the sleeve or plug to be protected from the stream of fluid passing through the aperture. In known arrangement, it is frequently the case that the end faces of plugs and sleeves are eroded by the streams or jets of fluid formed as the fluid passes through the apertures in the cage. These streams or jets can quickly erode the plug or sleeve, in particular eroding the surface of the plug or sleeve sealing face that contacts the seat in the fully closed position. This in turn reduces the ability of the plug or sleeve to form a complete seal to prevent fluid flow when fully closed.

As noted, the apertures in the cage are preferably arranged in rows. The arrangement and relationship of apertures in adjacent rows may be any suitable or preferred pattern. However, in one preferred arrangement, the centers of the apertures in adjacent rows of the cage are offset from each other circumferentially around the exterior surface of the cage. In a particularly preferred arrangement, the apertures are arranged such that adjacent apertures in adjacent rows extend in a helical pattern along and around the cage. This is a particularly preferred arrangement when the apertures are angled in the aforementioned preferred manner. This arrangement is of particular advantage when the assembly is being used to process fluid streams produced from subterranean wells, in particular fluid streams comprising a plurality of liquid phases, especially oil and water, and a gas phase.

The apertures may extend through the cage in any suitable direction. In known arrangements, the apertures extend radially inwards through the cage wall. In one preferred arrangement, the apertures extend inwards, in a plane perpendicular to the longitudinal axis of the cage, but at an angle to the radial direction, in order to direct the fluid entering the cage in a circular flow pattern within the cage cavity. In a particularly preferred arrangement, the apertures extend through the cage wall and open tangentially to the inner surface of the wall. In a further preferred arrangement, the apertures extend through the cage wall at an angle to the plane perpendicular to the longitudinal axis of the cage and at an angle to the radial direction. In particular, the apertures extend at an angle to the plane perpendicular to the longitudinal axis in the direction of fluid flow. In this way, the fluid is caused to flow in a helical flow pattern within the cage. In particular, the apertures may be angled to avoid the fluid stream from one aperture contacting the fluid stream from an adjacent aperture, to minimize fluid impact, reduce turbulence and minimize fluid shear.

The flow control assembly comprises means to open and close the apertures extending through the cage, in order to control the flow of fluid through the valve assembly. In particular, the flow control assembly comprises a closure assembly having first and second closure members. The first closure member is disposed within the cage and is moveable with respect to the cage and the apertures extending through the wall of the cage. The first closure member acts to open or close the apertures by closing and sealing the inner end of each aperture. The first closure member is moveable between a first position, in which it obscures and closes all the apertures in the cage, and a second position, in which it overlies and obscures none of the apertures in the cage. The first closure member may be positioned between the first and second positions, such that a portion of the apertures are open for the passage of fluid therethrough, and the remainder of the apertures are closed to the flow of fluid. The flow of fluid through the valve assembly may thus be controlled by the appropriate position of the first closure member.

The first closure member may have any suitable form. For example, in the case of a generally cylindrical tubular cage, the first closure member may be a cylindrical sleeve or a cylindrical plug, the outer diameter of which corresponds to the inner diameter of the cage.

The second closure member is disposed outside the cage and is moveable with respect to the cage and the apertures extending through the wall of the cage. The second closure member acts to open or close the apertures by closing and sealing the outer end of each aperture. The second closure member is moveable between a first position, in which it obscures and closes all the apertures in the cage, and a second position, in which it overlies and obscures none of the apertures in the cage. The second closure member may be positioned between the first and second positions, such that a portion of the apertures are open for the passage of fluid therethrough, and the remainder of the apertures are closed to the flow of fluid. The flow of fluid through the valve assembly may thus be controlled by the appropriate position of the second closure member.

The second closure member may have any suitable form. For example, in the case of a generally cylindrical tubular cage, the second closure member may be a cylindrical sleeve, the inner diameter of which corresponds to the outer diameter of the cage.

The first and second closure members may be moved independently from one another, relative to the cage. In this case, the valve assembly will further comprise an actuator assembly for each of the first and second closure members. In a preferred arrangement, the first and second closure members are moved together, preferably by being connected to one another, by a single actuator assembly. This arrangement offers certain advantages, as described hereinafter.

Both the first and second closure members may be used to control the flow of fluid through the valve assembly. In one arrangement, the first and second closure members are sized relative to one another and the cage that, when moved together, at a given position of the closure assembly, the first and second closure members are closing the same apertures through the cage wall and leaving the same apertures open for fluid flow. In other words, a given aperture will either be open at both its inner and outer ends or will be closed at both its inner and outer ends.

In a preferred arrangement, the first and second closure members are sized and arranged differently with respect to one another and the cage, such that in a given position of the closure assembly, the first and second closure members are obscuring and closing a different number of apertures. In particular, one of the first or second closure members is arranged such that, as the closure members are moved from the first, closed position, the said one closure member begins to open the respective ends apertures in the cage wall, while the other ends of the same apertures remain closed. In this way, the said one closure member acts as a shut-off member, responsible for shutting off the flow of fluid through the valve assembly, while the other closure member is acting to control the flow of the fluid through the apertures in the cage. While the respective ends of apertures will be opened as the said one closure member moves from the first, closed position towards the second, open position, fluid will not flow through the apertures in the cage wall until the other of the two closure members has moved sufficiently to open the apertures to fluid flow. In this way, the other closure member acts as the flow control member, the position of which is responsible for determining the flow of fluid through the cage and the valve assembly. Preferably, the member acting as the shut-off member is the second closure member, disposed outside the cage, while the flow control member is the first closure member disposed within the cage.

In a particularly preferred arrangement, as noted hereinbefore, the cage is a generally cylindrical tube. The first closure member is a plug or sleeve extending and moveable longitudinally within the tubular cage, while the second closure member is a sleeve extending and moveable longitudinally outside the tubular cage. In the preferred arrangement, the second or outer closure member is the shut-off member and the first or inner closure member is the flow control member. The respective roles of the two closure members may be achieved by having the first closure member longer than the second closure member. In this way, as the two closure members are moved longitudinally together from the first, closed position towards the second, open position, the second closure member progressively reveals the outer ends of the apertures in the cage. Once the outer ends of the apertures are revealed, further longitudinal movement of the first closure member within the cage is required to open the inner ends of the same apertures and allow fluid flow to occur. The flow rate of fluid through the cage and the valve assembly as a whole is thus controlled by the longitudinal position of the first closure member within the cage, and not the longitudinal position of the second closure member outside the cage.

As noted hereinbefore, the first and second closure members may be moveable independently of one another. However, a preferred closure assembly is one in which the first and second closure members are moveable together, more preferably by being connected. In one preferred arrangement, the first and second closure members extend from a single support member, such that movement of the support member causes corresponding movement of both the first and second closure members. Preferably, the support member is in the form of a piston moveable within a chamber.

The closure assembly is moved by means of an actuator. Actuator systems suitable for use in the valve assembly of the present invention are known in the art and include a range of reciprocating actuator systems. The actuator system may be operated electrically, pneumatically, or hydraulically or by a combination of these means. Again, such systems are known in the art.

The closure assembly may be connected to the actuator system by a shaft. This is particularly advantageous as it allows the actuator module itself to be mounted on the exterior of the valve assembly, so that it may be serviced and or removed without requiring the entire valve assembly to be disassembled. Such an arrangement is also known in the art.

The actuator may be arranged to move the shaft longitudinally, such that the shaft reciprocates, together with the respective closure members. Such an arrangement is well known in the art and suitable reciprocating actuator assemblies are commercially available. In a particularly preferred arrangement, the closure members are moved by one or more shafts that transfer drive from the actuator system to the closure assembly by rotation of the shaft or shafts, as opposed to the conventional reciprocating motion. In the preferred embodiment, with the first and second closure members extending from a single support member, a single shaft is required to move the support member and the two closure members. The shaft may be connected to the support member in any suitable way to translate rotational movement of the shaft into longitudinal movement of the closure members with respect to the tubular cage. A particularly suitable means for transferring the drive is to provide a portion of the length of the shaft with a thread that engages a ball screw nut held captive in the support member.

As noted hereinbefore, in one embodiment, one of the first and second closure members acts as a shut-off member, that is to close the valve assembly and prevent the flow of fluid therethrough. As also noted, a preferred arrangement is to have the second closure member, disposed outside the cage, as the shut-off member. In order to effectively close the valve assembly to the flow of fluid, the relevant member is provided with a seat which is engaged by a sealing surface of the member when in the first or closed position. Accordingly, in the preferred arrangement, the second member is provided with a seat extending around the cage, which is engaged by a sealing surface of the second member when in the first or closed position.

Seat arrangements for use with the shut-off closure member are known in the art. However, it has been found that the seat of such a valve assembly can suffer significant wear, in particular due to erosion by fluid flowing past and over the seat as it enters the apertures in the cage. The erosion of the seat is particularly acute when the fluid stream has solid particles entrained therein. Similar significant wear of the sealing surface of the closure member can also take place. Accordingly, it is preferred that the seat is disposed in a position that is displaced from the apertures in the cage, whereby the seat is out of the direct flow path of fluid passing through the apertures and entering the cage.

It is preferred to employ a seating assembly that is self-sharpening. That is, the action of the closure member moving into and out of engagement with the seat itself wears both the seat and the sealing surface of the closure member in a predetermined pattern that removes damage to the seat and the sealing surface of the closure member. The closure member is preferably formed of a hard material, relative to the seat, which is of a softer material. In this way, the action of the closure member contacting the seat wears the surface of the seat, to remove any pits and the like formed as a result of damage caused to the seat by action of the fluid and/or any entrained solids.

The surface of the seat preferably extends at an acute angle to the longitudinal axis of the closure member and the cage, whereby solid particles that fall onto or come to rest on the surface of the seat are caused to move off the seat, for example under the action of gravity. In this way, the seat may be kept relatively clean of debris, limiting damage to the sealing surfaces of the seat and the closure member and improving the fluid seal between the seat and the closure member.

A seat may be provided to be contacted by each of the closure members, with each closure member having a respective seat disposed to be contacted by a sealing surface of the closure member when the closure member is in the first, closed position. More preferably, a seat is provided for one of the first or second closure members only.

In one arrangement, the seat is formed within the cage, to be contacted by a sealing surface of the first closure member. For example, the seat may be formed as a shoulder within the cage member, with which the first closure member is brought into contact, when moving into the first, closed position. In such a case, the seat is preferably formed as an angled shoulder within the cage, such that solid debris on the cage is directed inwards towards the center of the cage member.

The seat is preferably formed outside the cage, so as to be contacted by the second member. As noted above, one preferred arrangement for the closure assembly of the valve assembly of the present invention comprises a generally cylindrical tubular cage, with a second closure member in the form of a cylindrical sleeve extending around the outer surface of the cage. The seat arrangement for the second enclosure member, disposed outside, that is on the upstream side of the cage member, is preferably formed and interacts with the second closure member in manner that allows the fluid pressure on the inlet side of the cage to bear against the second closure member and force the sealing portion of the second closure member into contact with the sealing surface of the seat. In this way, the fluid seal between the second closure member and the seat is assisted by the inlet fluid pressure.

Further or in addition to the use of the inlet fluid pressure to urge the second closure member against the sealing surface of the seat, the seat and the second closure member may be arranged such that, when in contact, stresses are developed in the closure member to urge the seat and closure member into contact. In particular, the seat and the second closure member may be arranged to generate an outward hoop force on the sleeve as the closure member is forced into contact with the seat by the actuator. This in turn improves the sealing efficiency of the sleeve against the surface of the seat.

One preferred design of seat assembly for the second closure member comprises a seat having a sealing surface extending at an angle to the longitudinal axis of the cage. Most preferably, the sealing surface of the seat extends away from the cage at an acute angle to the longitudinal axis of the cage in the direction of movement of the second closure member when moving into the first, closed position. The second closure member is provided with a complimentary sealing surface, in particular on the end surface of the sleeve. The complimentary sealing surface may comprise a single surface extending at an appropriate angle so as to form a seal with the angle sealing surface of the seat, when the sleeve is in the first, closed position. In one arrangement, the sealing surface on the end surface of the sleeve extends at an acute angle to the longitudinal axis of the cage in the direction of movement of the second closure member when moving into the second open position. In this way, the sleeve is provided with a leading edge, which contacts the sealing surface of the seat.

Alternatively and more preferably, the sleeve may comprise a compound surface having at least two surface portions extending at an obtuse angle to one another. The ridge formed by the compound surfaces contacts the sealing surface of the seat and provides the seal, to prevent the flow of fluid through the cage. As the sleeve moves into and out of the first, closed position, the ridge is caused to move across the sealing surface of the seat, removing damage caused to the surface by the erosive effects of the fluid.

As described hereinbefore, the valve assembly of the present invention is particularly suitable for controlling the flow of fluid streams at high pressure, in particular in the control of fluid streams produced by a subterranean well or the fluid streams flowing into and out of a wellhead assembly. When operating with fluid streams at high pressures, a particular problem arises with the actuation of the valve assembly and the movement of the components exposed to the fluid stream. The problem arises when the valve components, such as the first and or second sleeves, are being acted upon by the fluid stream, the pressure of which bears upon one or more surfaces of the components and urges them to a particular position, for example the first, closed position or the second, open position. In such a case, the actuating mechanism must move the valve components against the action of the fluid pressure. This can place significant strain on the actuating mechanism, requiring the actuator to be increased in power to cope with the additional burden. This burden increases as the operating pressure of the valve assembly increases.

Accordingly, in one embodiment, it is preferred to have the closure assembly of the valve assembly arranged so as to be balanced with respect to the fluid pressure within the valve. It is especially preferred to arrange the closure assembly to be balanced with respect to both fluid at the inlet pressure, that is fluid pressure upstream of the cage, and fluid at the outlet pressure, that is fluid pressure downstream of the cage.

With respect to fluid on the inlet side of the cage, the second closure member, in the form of a sleeve extending around the cage, has one or more end surfaces extending laterally of the longitudinal axis of the sleeve and the cage. In use, fluid at the inlet pressure bears upon the lateral end surfaces, urging the second closure member into the second, open position. In one embodiment, the valve assembly is provided with a chamber within the housing in fluid communication with the interior of the valve housing upstream of the cage and closure assembly. In operation, fluid at the fluid inlet pressure is present in the chamber. The closure assembly is moveable longitudinally within the chamber and has surfaces exposed to fluid in the chamber at the inlet pressure. In particular, the closure assembly is provided with laterally extending surfaces within the chamber. The laterally extending surfaces, which may extend perpendicular to the longitudinal axis of the closure member and the chamber or at an angle thereto, have a surface area related to the area of the lateral surfaces of the second closure member. By appropriate sizing of the lateral surfaces of the closure assembly extending within the chamber relative to the surface area of the laterally extending surfaces of the second closure member, the closure assembly can be balanced with respect to the fluid inlet pressure. In this way, the forces generated on the surfaces of the closure member by fluid on the inlet side of the closure assembly and urging the closure member into the open position may be counteracted by fluid at the same pressure within the chamber and acting upon the respective surfaces of the closure assembly. The closure member will thus be in a neutral state having regard to the pressure of fluid on the inlet side of the closure assembly, which in turn means that the actuator assembly is required to exert less force to move the closure member. This in turn allows the components of the actuator assembly and the shaft to be significantly smaller in dimensions, in particular when the entire assembly is operating with a fluid under very high pressures.

Thus, in this respect, the term 'balancing' is a reference to the arrangement in which the resultant of the forces acting on the closure member by the action of the fluid at the inlet pressure is zero, that is the balancing is neutral.

In some applications, it may be preferable to have the second closure member biased into one of the open or closed positions, such as when the valve assembly is required to be in a 'fail-safe open' or 'fail-safe closed' condition. In this arrangement, the resultant forces are not zero and the fluid at the inlet pressure is used to bias the closure member into one of the first, closed and the second, open positions. This may be achieved in the embodiment described hereinbefore by appropriate sizing of the laterally extending surfaces within the chamber. In this way, the valve assembly may be arranged to operate in one of a fail-safe neutral, fail safe open or fail safe closed mode.

In one preferred arrangement, the closure member comprises a piston moveable longitudinally within the chamber, the first and second closure members extending from one end of the piston.

A similar arrangement to balance the pressure of fluid at the outlet pressure downstream of the cage may also be provided, either alone or in combination with the aforementioned assembly for balancing the inlet fluid pressure. In one preferred arrangement, the valve housing is provided with a second chamber in fluid communication with the interior of the valve housing downstream of the cage, such that in use the second chamber is filled with fluid at the fluid outlet pressure. The fluid communication may conveniently be achieved using one or more ports extending through the first closure member, allowing fluid to flow from within the cage to the second chamber. The closure member is arranged to be moveable longitudinally within the second chamber and has surfaces exposed to fluid in the second chamber at the outlet pressure. In particular, the closure assembly is provided with laterally extending surfaces within the second chamber. The laterally extending surfaces, which may extend perpendicular to the longitudinal axis of the closure member and the second chamber or at an angle thereto, have a surface area related to the area of those lateral surfaces of the first closure member exposed to the fluid at outlet pressure within the cage. By appropriate sizing of the lateral surfaces of the closure assembly extending within the second chamber relative to the surface area of the laterally extending surfaces of the first closure member, the closure assembly can be balanced with respect to the fluid outlet pressure. As with the balancing of the inlet fluid pressure, the outlet fluid pressure may be balanced so as to have a zero resultant force on the closure assembly, or alternatively to bias the first closure member into one of the first, closed and the second, open positions.

In one preferred arrangement, the closure member comprises a piston moveable longitudinally within the second chamber. In a particularly preferred embodiment, the valve assembly is provided with both a first and a second chamber, to provide pressure balancing with respect to both the fluid inlet and fluid outlet pressure, as hereinbefore described. Most preferably, a single piston is arranged to extend within and move longitudinally within both the first and second chambers, the first and second closure members extending from one end of the piston.

In one embodiment, the valve assembly of the present invention may be provided as a check valve, that is a valve operable to limit the flow of fluid therethrough to one direction only. In the check valve embodiment, the valve assembly is provided with first and second fluid balancing chambers, as hereinbefore described, such that fluid at both the inlet pressure and the outlet pressure acts upon the closure member. The valve assembly is not provided with an actuator assembly. Rather, the position of the closure assembly, in particular the first and second closure members relative to the cage, is determined by the relative pressures of the fluid at the inlet and the outlet. The assembly is arranged with the pressure balancing such that, under normal operating conditions, with the inlet fluid pressure greater than the outlet fluid pressure, the closure assembly is held with the first and second closure members in the second, open position. In this position, all the apertures through the cage are open and maximum fluid flow from the inlet, through the cage to the outlet is maintained. Should a situation of reverse fluid flow occur, the fluid pressure at the inlet will drop below that of the fluid at the outlet. In such a case, the assembly is arranged with the pressure balancing such that the closure assembly is forced to move to the position with the first and second closure members in the first, closed position. In this position, all apertures through the cage are closed at both their inner and outer ends and fluid is prevented from passing through the closure assembly from the outlet to the inlet in the reverse direction. Once normal flow conditions have returned, the closure assembly is moved by the fluid pressures to the open position, restoring the flow of fluid through the valve assembly.

As noted hereinbefore, it is advantageous to have the flow control assembly disposed within, preferably centrally within, a cavity formed within the valve housing and to allow incoming fluid to flow into the cavity and be distributed around the flow control assembly, before passing through the apertures in the cage. It has been found that, in addition to being of advantage in the valve assembly of the first aspect of the present invention, this arrangement has advantages in a range of valve assemblies employing flow control assemblies having a cage.

Accordingly, in a further aspect, the present invention provides a valve assembly comprising:

a valve housing;

an inlet for fluid entering the valve housing;

an outlet for fluid leaving the valve housing;

a flow control assembly disposed within the valve housing between the inlet and the outlet, whereby fluid entering the valve housing is caused to flow through the flow control assembly, the flow control assembly comprising:

a cage having apertures therethrough to provide passage for fluid passing from the inlet to the outlet;

a closure member moveable with respect to the cage between a first closed position, in which the closure member closes the an end of all of the apertures in the cage, and a second open position, in which all the apertures in the cage are open;

the flow control assembly being disposed in a cavity within the housing and wherein the inlet opens at an angle to the radial direction of the cavity, to direct incoming fluid around the cavity to distribute the fluid around the cage in the flow control assembly.

By having the inlet extend at an angle to the radial direction of the cavity, as opposed to more conventional inlet openings that extend in the radial direction, fluid is directed at an angle into the cavity and caused to flow around the flow control assembly, distributing the fluid around the flow control assembly. In a preferred arrangement, the inlet opens at a tangent to the wall of the cavity. In use, this causes fluid to enter the cavity and establish a helical flow pattern within the cavity, flowing in a helical pattern inwards towards the cage of the flow control assembly, where it passes through the apertures in the cage, when opened.

In a particularly preferred arrangement, the inlet has an opening in the wall of the cavity disposed and oriented to direct fluid into a channel or groove in the wall of the cavity. The channel or groove extends in the wall of the cavity around the flow control assembly and serves to distribute fluid within the cavity. Preferably, the channel or groove has a cross-sectional area that decreases progressively in the direction of fluid flow. In this way, fluid in the channel or groove is forced to leave the channel and enter the cavity to flow to the flow control assembly. In one particularly preferred arrangement, the channel or groove has the form of an involute extending around the outer portion of the cavity, more particularly with the channel widening and thinning in the direction of fluid flow, to evenly distribute in the incoming fluid flow around the cavity.

In a further arrangement, the flow control assembly of the present invention may be employed as a choke and incorporated in a choke assembly. In particular, the flow control assembly may be used to replace the plug and cage assembly of a conventional plug-and-cage choke.

Accordingly, the present invention in a further aspect also provides a choke assembly comprising:
a fluid inlet;
a fluid outlet; and
a flow control assembly as hereinbefore described disposed between the fluid inlet and the fluid outlet, whereby fluid entering the choke assembly through the inlet is caused to pass through the flow control assembly to leave the choke assembly through the outlet.

A preferred form of choke assembly is described in pending European patent application No. EP07253806.9, which is employed both to control the pressure of a multiphase fluid and effect at least a partial separation of the phases of the fluid. The choke assembly of this design is of particular use in the control of multiphase fluid streams produced from a subterranean oil and gas well. The relevant details of the choke assembly are as follows.

It is frequently the case, that the fluid stream produced from a subterranean well comprises a plurality of phases. In particular, a typical fluid stream will comprise a gas phase and at least one liquid phase, often together with entrained solids. The fluid stream often comprises two liquid phases, most notably oil and water. In the processing of the produced fluid, it is necessary to separate the various phases of the fluid stream. It has been found that the flow control assembly of the present invention is advantageously employed in a choke assembly that provides at least a first stage in such separation.

A preferred form of choke assembly comprises the pressure control assembly as hereinbefore described within a separation zone with the choke housing. The pressure control assembly is disposed within the separation zone downstream of the fluid inlet. The fluid inlet is preferably arranged to direct the incoming fluid stream into the separation zone at angle to the radial direction, most preferably tangentially into the inner walls of the housing. The inlet may be arranged perpendicular to the longitudinal axis of the housing. However, it is particularly preferred that the fluid inlet is arranged at an angle to this perpendicular in the downstream direction. Such an angled and tangential inlet causes the incoming fluid stream to flow in a helical or spiral pattern within the separation zone within the housing. The rotation of the fluid stream causes the phases to separate according to their relative densities, such that the phases having a higher density are concentrated in the radially outer regions of the separation zone and the lighter or less dense phases are concentrated in the radially central region of the separation zone. In particular, a central region of a substantially gaseous phase is formed, surrounded by a liquid phase. Entrained solids are captured within the liquid phase and migrate to the inner wall of the housing, as the fluid rotates. Within the liquid surrounding the core of gas, the liquid phases separate, such that the lighter, less dense phase, in particular oil, concentrates radially inwardly of the heavier, more dense phase, in particular water.

The choke is operated to have the interface between the gas core and the surrounding liquid intersecting the flow control assembly. With the pressure control assembly operated to open the apertures in the cage to the flow of fluid, gas from the gas core passes through the cage. Liquid also passes through the cage and flows to the fluid outlet together with the gas, as partially separated fluid phases. If a plurality of liquid phases are present, the liquid entering the cage through the apertures will be richer in the lighter, less dense fluid, such as oil.

Preferably, a second fluid outlet is provided in the housing downstream of the pressure control assembly, such that fluid that does not enter the cage and flow through the pressure control assembly passes through the housing and is removed and collected. The fluid collected in this way is rich in the heavier phases, in particular the liquids and any entrained solids. For example, the fluid removed through the second fluid outlet will be richer in water and entrained solids, contain a minor portion of oil and little gas. The size and dimensions of the housing downstream of the pressure control assembly are selected according to the physical properties and composition of the fluid stream to be processed, in order to enhance separation of the various phases. In particular, the downstream portion of the housing preferably acts as a settling zone for the separation of the more dense liquids and the entrained solids, before they are removed from the housing through the second outlet. Means for returning the lighter fluid phases, such as gas and less dense liquids, the region adjacent the pressure control assembly are preferably provided in the downstream separation region, whereby the lighter components separated may leave the choke assembly through the pressure control assembly.

The valve assembly of the present invention provides for the fast acting control of fluid flowrate and/or pressure. The assembly may be constructed to operate at very high fluid pressures. In particular, the assembly may be applied to control the flow and/or pressure of fluids of up to 10,000 psi or greater. Further, the assembly can operate with a significant pressure differential between the fluid streams at the inlet and the outlet, in particular with pressure differentials of up to 3,000 psi or higher. These features render the valve assembly particularly advantageous when employed to control the flow of fluids produced from a subterranean well, in particular being able to accommodate fluids at wellhead pressures. This, in turn, makes the assembly particularly suitable for use in or near wellhead installations, such as subsea installations. In addition, the flow control assembly may be arranged to minimize the shear to which fluid flowing through the assembly is subjected. This is particularly advantageous in the processing of multiple phase fluid streams where separation of the fluid phases is required. Again, this renders the assembly particularly advantageous for the processing of fluid streams produced from subterranean wells, in particular mixed phase gas and oil streams, typically with associated water and/or entrained solids.

The flow control assembly described hereinbefore has been found to be particularly suitable for inclusion in a range of valve and choke assemblies, as described above. The flow control assembly may be provided as a separate component, for example for the modification of existing valve and choke assemblies when removed for maintenance and overhaul.

Accordingly, the present invention provides a flow control assembly for use in a valve or a choke, the flow control assembly comprising:

a cage having apertures therethrough to provide passage for fluid passing from the inlet to the outlet;

a closure assembly having:

a first closure member disposed within the cage and moveable with respect to the cage between a first closed position, in which the first closure member closes the innermost end of all of the apertures in the cage, and a second open position, in which the innermost end of all the apertures in the cage are open; and a second closure member disposed outside the cage and moveable with respect to the cage between a first closed position, in which the second closure member closes the outermost end of all of the apertures in the cage, and a second open position, in which the outermost end of all the apertures in the cage are open.

The details of the flow control assembly are as described hereinbefore.

Referring to FIG. 1, there is shown a valve assembly, generally indicated as 2, according to a first embodiment of the present invention. The valve assembly 2 comprises a generally cylindrical lower housing 4 and a generally cylindrical upper housing 6. The upper housing 6 has a flange 8 formed around its lower end portion, allowing the upper housing 6 to be mounted to the lower housing 4 by means of bolts 10 in a conventional manner.

References herein to 'upper' and 'lower' are used for the purposes of ease of identification of components in the accompanying figures and are used in relation to the orientation of the apparatus shown in the figures only, it being understood that the assemblies of the present invention may be used in any appropriate orientation and need not be limited to operation in the orientation shown in the accompanying drawings.

The lower housing 4 comprises a generally cylindrical flow chamber 12 formed therein and has an inlet 14 for fluid and an outlet 16 for fluid. The inlet 14 is arranged laterally to open in the side of the flow chamber 12, as shown in FIG. 1, while the outlet 16 is arranged axially in the lower portion of the lower housing 4, as also shown in FIG. 1. Fluid to be processed by the valve assembly 2 is led to the inlet 14 by a conventional pipe (not shown for clarity). The processed fluid is led away from the outlet 16 through a conventional pipe 18, mounted to the lower portion of the lower housing by means of a flange 20 and bolts 22, again of conventional design.

The upper housing 6 comprises a first, generally cylindrical chamber 24 therein in its lower region which opens into the flow chamber 12 in the lower housing 4. The upper housing 6 further comprises a second, generally cylindrical chamber 26 therein in its upper region. The second chamber 26 is sealed from the first chamber as described hereinafter. An actuator assembly 30, of known design and commercially available, is mounted to the upper end of the upper housing 6 by bolts 32, in conventional manner. The actuator assembly 30 may comprise any suitable form of actuator, for example a hydraulic, pneumatic, electro-hydraulic or electric actuator. Electric actuators are preferred.

The valve assembly 2 further comprises a flow control assembly, generally indicated as 34, disposed within the flow chamber 12 of the lower housing, the flow control assembly 34 having a closure assembly, generally indicated as 36. Components of the closure assembly 36 extend into the first chamber 24 in the upper housing 6 and into the second chamber 26 of the upper housing 6. The closure assembly 36 is sealed to the interior of the upper housing 6 at the junction between the first and second chambers 24, 26. Details of the flow control assembly and the closure assembly are described hereinafter.

A shaft 38 extends from the actuator assembly 30 and connects with the upper end of the closure assembly 36, further details and the operation of which are provided herein below.

Figure 2:
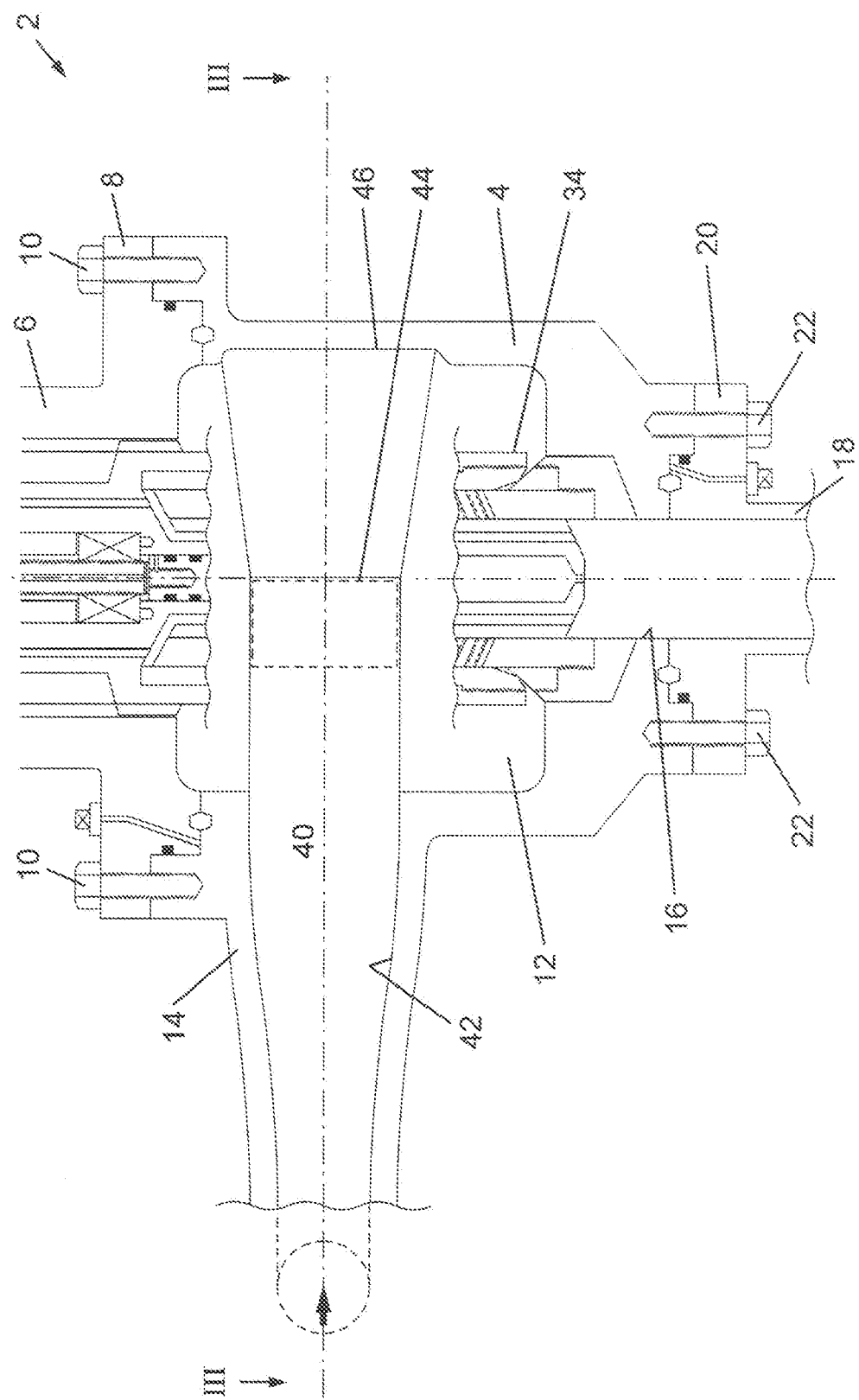
FIG. 2 is a cut-away, cross-sectional view of the lower housing of the valve assembly of FIG. 1.

As noted above, the fluid inlet 14 to the flow chamber 12 of the lower housing 4 is disposed in the side of the lower housing, so as to direct incoming fluid laterally into the flow chamber 12. Referring to FIG. 2, there is shown a cut-away cross-sectional view of the lower housing 4, with a portion of the flow control assembly 34 removed, to show details of the fluid inlet arrangement of the flow chamber 12. A diagrammatical cross-sectional view along the line III-III of FIG. 2 is shown in FIG. 3.

Referring to FIG. 2, the inlet 14 is arranged to have an inlet passage 40 extending tangentially into the flow chamber 12. The inlet 14 is formed to provide the inlet passage 40 with a generally circular feed portion 42, and a generally rectangular orifice 44, indicated by a dotted line, opening into the flow chamber 12. The inlet passage 40 is arranged to open at the orifice 44 tangentially to the inner wall of the lower housing 12. In this way, fluid entering the flow chamber 12 through the inlet passage is caused to flow in a circular pattern within the flow chamber 12. This has the effect of distributing the fluid around the flow control assembly 34 within the flow chamber 12. This has a number of advantageous effects. First, the incoming fluid is not caused to directly impinge upon the outer surfaces of the flow control assembly 34, as is the case with known and conventional plug-and-cage choke designs. This in turn prevents damage to the flow control assembly 34 arising from the impact of entrained solid materials and particles. Second, introducing the fluid into the flow chamber 12 tangentially allows the fluid to flow in a lower shear regime that is not possible with the conventional and known arrangements, in which the incoming fluid is directed at the plug-and-cage assembly. This in turn reduces the effects to which the various phases in the fluid stream are mixed, perhaps undoing earlier separation that may have occurred in the process lines and equipment upstream of the valve assembly. Further, the circular or rotating flow pattern within the flow chamber 12 induces separation of the different phases within the fluid stream, according to the respective densities of the phases. Further, the arrangement shown in the figures ensures that the incoming fluid stream is evenly distributed within the flow chamber 12 around the flow control assembly. This in turn increases the effectiveness and efficiency of the flow control assembly in controlling the flowrate and/or pressure of the fluid stream.

The inner wall of the lower housing 4 defining the flow chamber 12 is formed with a channel 46 therein. The channel 46 is aligned with the orifice 44 and forms an involute path for fluid entering the flow chamber 12. The channel 46 is extends circumferentially around the flow chamber 12, as shown in FIG. 3. The channel 46 decreases in cross-sectional area, travelling in the circumferential direction away from the orifice 44, that is the path followed by the incoming fluid stream. In this way, the fluid stream is encouraged gradually to enter the central region of the flow chamber 12 and flow towards the centrally located flow control assembly 34.

Details of the cross section of the channel 46 are shown in FIGS. 4a, 4b, 4c and 4d at the positions A, B, C and D of FIG. 3, respectively. As can be seen, the cross-sectional area of the channel 46 decreases in the direction of fluid flow circumferentially away from the inlet orifice 44. This reduction in cross-sectional area of the channel 46 ensures that fluid leaves the channel as it travel circumferentially around the flow chamber 12, as noted above. This reduction in cross-sectional is achieved in the embodiment shown in FIGS. 2 and 3 by having the depth of the channel 46 decrease in the direction extending circumferentially away from the orifice 44. However, in the embodiment shown, this reduction in depth is accompanied by an increase in the width of the channel in the longitudinal direction of the lower housing 12. This increase in width has the effect of distributing the fluid stream longitudinally within the flow chamber 12. This in turn ensures that the flow control assembly has an even exposure to the fluid stream to be controlled. The reduction in cross-sectional area of the channel 46 is preferably gradual or progressive, as shown in FIGS. 2 and 3. In the embodiment shown, the cross-sectional area reduces by 25% for each 90° of turn of the fluid stream. Thus, if the cross-sectional area of the orifice 44, as shown in FIG. 4a is A, the cross-sectional area of the channel at the positions shown in FIGS. 4b, 4c and 4d is 0.75 A, 0.5 A and 0.25 A, respectively.

Figure 5:
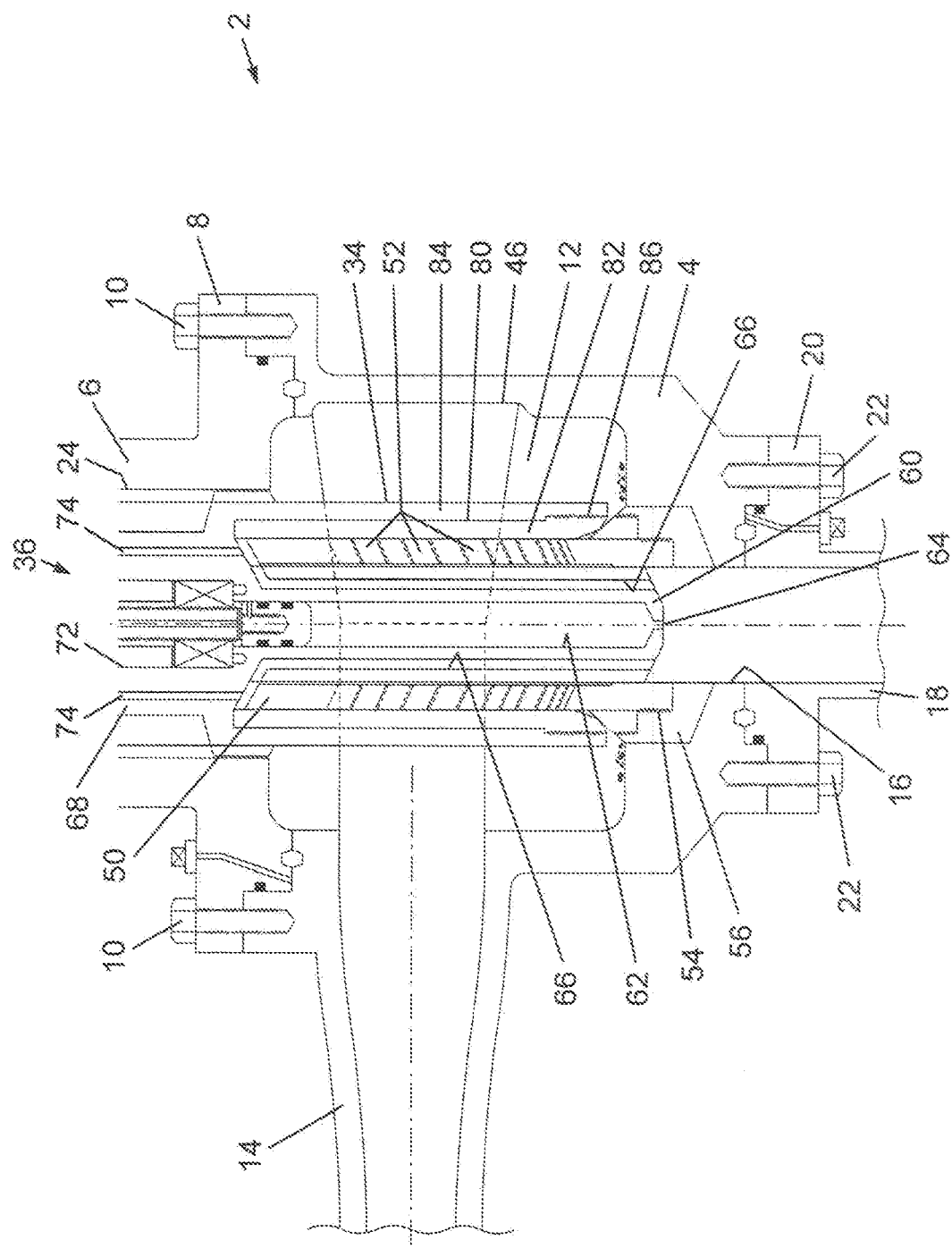
FIG. 5 is a cross-sectional view of the lower housing of the valve assembly of FIG. 1, showing the flow control assembly therein.

Referring to FIG. 5, there is shown a vertical cross-sectional view of the lower housing 4 of the valve assembly 2 of FIG. 1, showing the flow control assembly 34. The flow control assembly 34 comprises a cage 50 formed as a generally cylindrical tube extending longitudinally within the flow chamber 12. The cage 50 has a plurality of apertures 52 extending therethrough, details of which are described herein below. The cage 50 has its lower end portion formed with a thread 54 on its outer surface. The cage 50 is mounted within the flow chamber 12 by being screwed into a threaded boss 56 inserted into the lower end wall of the lower housing 12 adjacent the fluid outlet 16. The interior of the cage 50 is in fluid flow communication with the fluid outlet 16 by means of a bore formed in the boss 56, such that fluid flowing through the apertures 52 in the cage 50 and entering the interior of the cage 50 may leave the valve assembly through the outlet 16.

The flow control assembly 34 further comprises a closure assembly 36. The closure assembly 36 comprises a plug 60 extending within the central bore of the cage 50. The plug 60 is machined to be a close fit with the inner walls of the cage 50 and is slideable longitudinally within the cage 50, as will be described hereinafter. The plug 60 is generally cylindrical, having a longitudinal bore 62 formed therein. The bore 62 is open to the interior of the cage 50 by virtue of a small diameter bore 64 formed in the end of the plug 60. In this way, fluid within the bore 62 is able to leave the plug 60, thus preventing a hydraulic lock occurring.

A plurality of pressure balancing bores 66 extending longitudinally through the plug 60. Each balancing bore 66 opens into the interior of the cage 50. The balancing bores 66 are features of the fluid balancing system in the valve assembly, details of which are described herein below.

The plug 60 is shown in the shut off, fully closed position in FIGS. 1 and 5, that is the plug 60 extends within the cage 50 and covers or obscures the inner ends of all the apertures 52 in the cage 50. It will be noted that the lower or free end of the plug 60 extends within the boss 56, that is a significant distance past the lowest apertures 52 in the cage 50.

The plug 60 depends at its upper end from the lower end of a generally cylindrical piston 68. The piston 68 extends upwards from the top of the cage 50, through the first chamber 24 in the upper housing 6 and into the second chamber 26, as shown in FIG. 1. The piston 68 is moveable longitudinally within the upper housing 6, that is vertically as shown in FIG. 1, in association with the plug 60. Seals 70 are disposed in the inner wall of the upper housing 6 at the junction between the first chamber 24 and the second chamber 26. The seals 70, of conventional or known configuration, allow the longitudinal movement of the piston 68 within the first and second chambers, but prevent fluid from passing between the first and second chambers 24, 26. The piston 68 has a central longitudinal bore 72 extending its entire length, communicating with the bore 62 in the plug 60 at its lower end and opening into the second chamber 26 at its upper end, to receive the shaft 38. A plurality of fluid balancing bores 74 extend longitudinally within the piston 68, the lower end of each balancing bore 74 communicating with a corresponding balancing bore 66 in the plug 60, and the upper end of each fluid balancing bore 74 opening into the second chamber 26 within the upper housing 6.

The closure assembly 36 further comprises a composite sleeve assembly 80. The sleeve assembly 80 is generally cylindrical and extends from the lower end of the piston 68 around and along the outer surface of the cage 50 such that the sleeve assembly 80 can obscure and cover the outer ends of the apertures 52 in the cage. The sleeve assembly 80 is formed to be a close fit around the exterior surface of the cage 50, while still allowing the sleeve assembly 80 to move longitudinally with respect to the cage 50. The sleeve assembly 80 comprises an inner sleeve 82, preferably formed from a hard wearing material, such as tungsten, and an outer sleeve 84, preferably from a softer structural material, such as stainless steel, both generally cylindrical in form. The outer sleeve 84 is unitary with the piston 68. The inner sleeve 82 extends within the outer sleeve and is retained by a threaded connection 86 at their respective lower ends.

By being attached to the piston 68, the sleeve assembly is moveable both with the piston 68 and the plug 60. In particular, the sleeve assembly 80 moves together with the plug 60 under the action of the actuator assembly 30. The control of the flow of fluid through the apertures 52 of the cage 50 is determined by the positions of the plug 60 and sleeve assembly 80 with respect to the cage. As shown in the figures, in this arrangement, the plug 60 extends a greater distance from the end of the piston 68 than the sleeve assembly 80. This arrangement in turn provides the plug 60 and the sleeve assembly 80 with different functions. In particular, in the arrangement shown, the sleeve assembly 80 primarily acts as a pressure shut-off member, that is to ensure that the pressure of fluid is isolated, when the assembly is in the fully closed position, as shown in FIG. 5, for example. When the assembly has been moved from the fully closed position shown, the control of the flow of fluid through the cage 50, and hence through the entire assembly, is primarily controlled by the plug 60.

In order to perform the function of a pressure shut-off member, that is isolate the pressure of fluid through the assembly, the sleeve assembly 80 is provided with a sealing arrangement at its lower end, that is the end distal of the piston 68. Referring to FIG. 6, there is shown an enlarged view of a portion of the pressure control assembly 34 of FIG. 1, in particular showing the lower or distal end of the sleeve assembly 80. A seating ring 90 is mounted in the boss 56 by a sealed connection 92 and extends around the cage 50. The seating ring 90 is formed from a hardened material having a high resistance to wear. A seating surface 94 is formed by the surfaces of the boss 56 and the seating ring 90 exposed within the flow chamber 12. As can be seen in FIG. 6, the seating surface 94 extends at an angle to the radial direction, such that it slopes away from the free end of the sleeve assembly 80. The action of the angled seating surface is twofold. First, by being angled, debris is prevented from collecting on the seating surface and stopped from preventing a fluid-tight seal being formed between the sleeve assembly 80 and the seating surface. Rather, solid particles and debris are collected in the lower region of the flow chamber 12, as viewed in FIG. 6, around the base of the cage. Second, the angle of the seating surface 94 cooperates with the surfaces on the end of the sleeve assembly 80 to be self-sharpening, as is described herein below.

The seating surface 94 cooperates with the end portion of the sleeve assembly 80. As shown in FIG. 6, the free or distal end of the outer sleeve 84 is finished perpendicular to the longitudinal axis of the sleeve assembly, plug and cage. The distal end of the inner sleeve 82 is formed with a compound surface comprising a first surface portion 96 radially outwards of a second surface portion 98. The first surface portion 96 extends at an angle to the radial direction that is more acute than the angle of the seating surface 94. The second surface portion 98 extends at an angle to the radial direction that is more obtuse than the angle of the seating surface 94. The first and second surface portions 96, 98 meet at a ridge 100. The details of the seating surface 94 and its cooperation with the surfaces at the distal end of the sleeve assembly 80 are shown in FIG. 7.

In operation, the ridge 100 is forced by the actuator assembly 30 into contact with the seating surface 94 of the seating ring 90, as the pressure control assembly is moved into the fully closed position, shown in FIGS. 6 and 7. Contact between the ridge 100 and the seating surface 94 forms a fluid-tight seal. Depending upon the force exerted by the actuator assembly 30, the ridge 100 is caused to slide along the seating surface 94, due to the angle of the seating surface 94. This sliding action causes the ridge 100 and seating surface 94 to wear and removes pits, marks and blemishes in the surfaces, which may prevent a proper fluid seal from being formed. In addition, the action of the actuator assembly 30 moving the sleeve assembly 80 in the longitudinally downwards direction, as viewed in FIGS. 6 and 7, results in a downward (as viewed in the figures) force being exerted on the ridge 100 and the distal end of the sleeve assembly 80 by the seating surface 94, as indicated by arrow P in FIG. 7. This force, normal to the seating surface 94, has a radially outwards component, which induces a hoop stress in the distal end portion of the sleeve assembly 80. The action of the hoop stress is to force the ridge 100 radially outwards, into the seating surface 94, as indicated by arrows Q in FIG. 7. This in turn increases the effectiveness of the seal formed between the ridge 100 and the seating surface 94.

As noted above, the plug 60 and sleeve assembly 80 extend different longitudinal distances from the piston 68 and with respect to the cage 50. The closure assembly 36 is moveable between a fully closed position, as shown in FIG. 6, for example, to a fully open position. In the fully closed position, the sleeve assembly 80 is sealed against the seating surface 94, as described above and shown in detail in FIG. 7. The plug 60 extends longitudinally within the cage 50, with its free end extending beyond the seating surface 94, as shown in FIG. 6. In the fully closed position, the plug 60 and the sleeve assembly 80 cover and obscure the inner and outer ends of the apertures 52 in the cage 50, respectively, thus preventing fluid flow and isolate pressure through the assembly 2. With the closure assembly in the fully open position, both the inner and outer ends of all the apertures 52 in the cage 50 are uncovered and open, allowing maximum fluid flow through the assembly. With the closure assembly 36 in an intermediate position, the flow of fluid is controlled between the maximum flow and zero.

Figure 8:
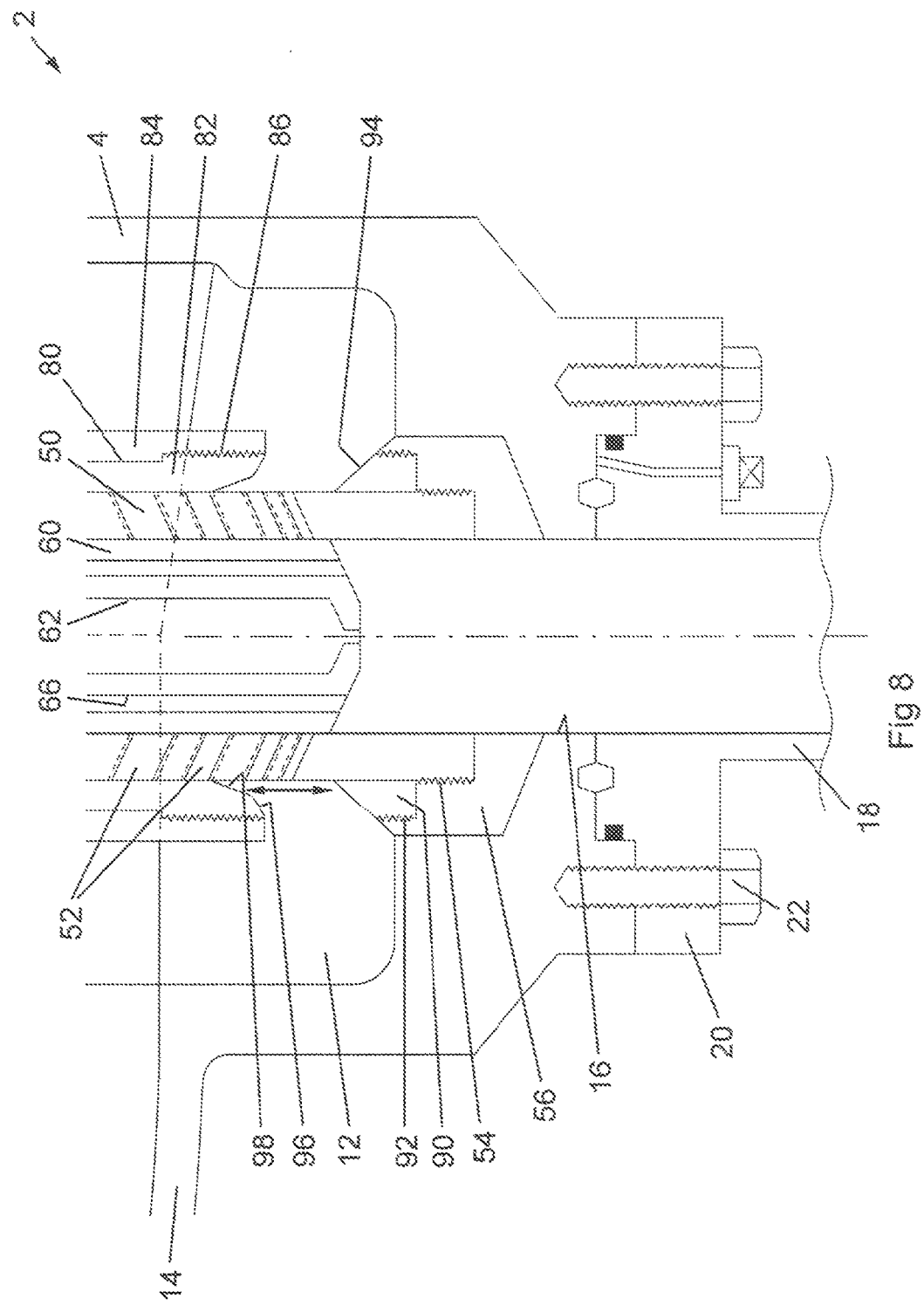
FIG. 8 is a cross-sectional view as in FIG. 6, but with the flow control assembly in a position intermediate between the fully closed position and the fully open position.

As noted, the sleeve assembly 80 has the primary function of shutting off fluid pressure, by sealing against the seating surface 94, when in the fully closed position. As the actuator assembly 30 moves the closure assembly 36 longitudinally from the fully closed position, the sleeve assembly 80 is lifted from the seating surface 94, as shown in FIG. 8. The sleeve assembly 80 is moved to expose the outer ends of the apertures 52 closest to the seating surface 94. However, the plug 60, extending longitudinally further than the sleeve assembly 80, still covers the inner ends of all the apertures 52 in the cage 50. As a result, fluid does not flow. Rather, further movement of the closure assembly 36 beyond the position shown in FIG. 8 is required, such that the inner ends of apertures 52 are exposed and the respective apertures fully opened to allow fluid to flow therethrough. It will thus be appreciated that, once the closure assembly 36 is moved from the fully closed position of FIG. 6, the control of fluid flow is achieved by the position of the plug 60 with respect to the cage 50.

Referring to FIG. 9, there is shown a detailed cross-sectional view of the actuator mechanism, in particular the connection between the actuator assembly 30 and the shaft 38. The actuator assembly 30 comprises an electric motor and gear drive assembly of conventional design (not shown for clarity). A torque shaft 110 extends from the actuator assembly 30 longitudinally through the end of the upper housing 6. The torque shaft 110 is connected to the upper end of the shaft 38, as viewed in FIG. 9 by a thread and pin arrangement 112. In operation, the torque shaft 110 is rotated by the electric motor and gear assembly, the rotation of which is transferred directly to the shaft 38. Seals isolate the torque shaft 110 from the electric motor 30. A bi-directional thrust bearing assembly 114 is disposed in the end of the upper housing 6 and contains the torque shaft. A seal 116 of conventional design is provided in the end of the upper housing around the end portion of the shaft 38, to provide a seal against fluid leaking from the upper chamber 26 of the upper housing 6. In addition, in operation, hydraulic fluid is supplied to the thrust bearing assembly 114 through a port 118 extending through the housing 6 and provides hydraulic compensation against the pressure of the fluid in the upper chamber 26 of the upper housing 6. The hydraulic fluid also lubricates the bearing assembly 114.

The end portion of the shaft 38 distal from the actuator assembly 30 (that is the lower end as viewed in the figures) extends into the piston 68, as shown in FIG. 10. The piston 68 of the closure assembly 36 comprises a longitudinal bore 120, within which is mounted a generally tubular insert 122 having a central bore 124, by means of a threaded connection 126. The central bore 124 of the insert 122 aligns with the central bore 62 within the plug 60. The shaft 38 extends longitudinally within the insert 122, a portion 130 of the shaft extending within the insert being provided with a thread on its outer surface. The insert 122 retains within the bore 120 of the piston 68 a ball screw nut 132 to engage with the threaded portion 130 of the shaft 38. Rotation of the shaft 38, by means of the actuator assembly 30, is translated into longitudinal movement of the piston 68 by the engagement between the threaded portion 130 of the shaft and the ball screw nut 132.

The shaft 68 and insert 122 are provided with seals 134 and 136, respectively, to prevent fluid ingress from the open, upper end of the piston, as shown in FIG. 10. The free or distal end of the shaft 38 is provided with a sealing nose 138, connected to the endmost portion of the shaft 38 by a threaded and pinned connection. The sealing cap 138 is provided with fluid seals 140, to bear against the wall of the bore 62 in the plug 60. In operation, the sealing cap 138 is caused to move longitudinally within the bore 62 in the plug 60, as the piston 68 is caused to move longitudinally by rotation of the shaft 38, as hereinbefore described.

As noted above, the cage 50 is provided with a plurality of apertures 52 therethrough, to allow fluid to flow from the flow chamber 12 to the outlet 16. The apertures 52 may be of conventional design, form and arrangement. However, the apertures are preferably formed to lie in discrete rows, separated by lands and to extend at an angle to the radial direction and at an angle in the longitudinal direction to the perpendicular to the longitudinal axis.

Conventional designs employ circular apertures extending perpendicular to the outer surface of the cage in the radial direction, that is extend radially inwards. The apertures are nested to have the apertures in one row extend into the interstices between the apertures of each adjacent row. In this way, the sleeve or plug moving along the outer or inner surface of the cage is varying the area of exposed apertures throughout its entire movement. This has the advantage of allowing a compact cage to be formed and use a plug or sleeve having a short stroke. However, this has been found to cause a very rapid and deleterious erosion of the end surfaces and portions of the plug or sleeve.

Referring to FIG. 11, there is shown a perspective side view of a cage 50 of preferred configuration. The cage 50 is shown in vertical cross-section in FIG. 12. A horizontal cross-sectional representation of the fluid flow through the cage 50 of FIG. 11 is shown in FIG. 13. As shown in FIG. 11, the cage 50 comprises a plurality of apertures 52 extending through the wall of the cage, each aperture having an opening in both the inner and outer surface of the cage wall. Each aperture extends at both an angle to the radial direction and at an angle in the longitudinal direction to the normal or perpendicular, as will now be described.

Referring to FIG. 11, the general direction of fluid flow through the bore of the cage 50 when in use is represented by arrow H. This general direction is longitudinally within the cage 50. Considering first the angle of the apertures in the plane perpendicular to the longitudinal axis, that is the horizontal as viewed in FIGS. 11 and 12, each aperture 52 extends through the wall of the cage 50 at an angle to the radial direction and opens tangentially to the inner wall of the cage 50. In operation, this causes the fluid to enter the cage 50 flowing downward and in a direction parallel to the inner wall, resulting in a circular flow pattern, as represented in FIG. 13. This downwards, circular flow pattern prevents the incoming jets of fluid from opposing apertures from colliding within the cage. This in turn helps to maintain any separation of fluid phases that may be occurred or been induced upstream of the valve assembly and reduces the burden on fluid separation apparatus downstream of the assembly.

Further, considering the angle of the apertures in the longitudinal direction, each aperture extends at an angle to the perpendicular or radial direction longitudinally in the direction of flow indicated by the arrow H. The apertures may extend at any suitable angle to the perpendicular or (as viewed in FIGS. 11 and 12) horizontal plane and the angle will depend upon such factors as the dimensions of the cage and valve assembly, and the nature and composition of the fluid being processed. In the arrangement shown in the figures, the apertures extend at an angle of 25° to the perpendicular or horizontal. The angle of the apertures may range from 5° to 50°, more preferably from 10° to 40°. It is preferred that the apertures are angled in the longitudinal direction sufficient to ensure that the jet of fluid entering the cage through one aperture and flowing in a circular pattern adjacent the inner wall of the cage avoids contacting the jet of fluid entering the cage through the adjacent aperture in the direction of travel of the fluid.

In operation, the arrangement of the apertures 52 induces the fluid to flow in a helical pattern within the cage in the general direction of flow H with the fluid being subjected to minimal shear.

The apertures 52 are arranged in discrete rows extending circumferentially around the cage, each row containing one or more apertures, more preferably at least two apertures. The rows are separated by portions of the cage wall having no apertures, or 'lands' 150. This allows the plug 60 to be positioned such that its end surface does not extend across the inner opening of one or more apertures 52. This position is represented diagrammatically in FIG. 14. In this way, the fluid entering the cage 50 through the open apertures 52 adjacent the end of the plug 60 is not caused to flow or cut across the end surface of the plug 60, in turn reducing the erosion of the plug 60 by the fluid stream. The endmost portion of the plug 60 may be provided with a taper, as shown in FIG. 7, for example, in order to improve the flow pattern of the fluid in the region adjacent the end of the plug 60.

A preferred arrangement and sizing of the apertures 52 in the cage 50 is shown in FIGS. 11 and 12. In particular, it is to be noted that the apertures 52 are arranged in rows each having two or four apertures therein. The apertures 52 vary in cross-sectional area available for fluid flow as shown, such that the apertures in the rows closest to the fluid outlet (that is the lower portion of the cage 50 as shown in FIGS. 11 and 12) have the smallest cross-sectional area available for fluid flow, with the area for fluid flow increasing in the reverse direction of general fluid flow H or up the cage as shown in FIGS. 11 and 12. The rows of apertures are grouped according to aperture size, with each group comprising two, three or more rows of apertures of a given cross-sectional area.

As shown in FIG. 11, the cross-section of each aperture is rhomboidal in shape, rather than rectangular, with the upper and lower edges of the rhomboid, as viewed in FIG. 11, being curved. This correction to the shape of the apertures has been found to be useful in minimizing the width of the lands required between adjacent rows of apertures, in turn reducing the overall length of the cage and closure assembly.

As described hereinbefore, the closure assembly 36 is provided with bores 66 and 74 extending through the plug 60 and piston 68 respectively. These bores are provided to allow the closure assembly 36 to be balanced with respect to the fluid pressure at the inlet and the outlet. The principles of this pressure balancing will now be described having reference to FIG. 1.

Referring to FIG. 1, as described above, the plug 60 and sleeve assembly 80 both depend from the piston 68 of the closure assembly 36. The sleeve assembly 80 is moveable longitudinally within the first chamber 24 in the upper housing 6 of the assembly 2. However, the sleeve assembly is not sealed within the first chamber 24. Rather, fluid is allowed to flow from the flow chamber 12 into the first chamber 24 past the sleeve assembly 80, which fluid is at the fluid inlet pressure. A shoulder 200 is formed at the junction between the sleeve assembly 80 and the piston 68.

The shoulder 200 is exposed to fluid within the first chamber 24. Fluid pressure within the first chamber 24 thus bears on the surface of the shoulder 200 and acts to move the sleeve assembly 80 and the entire closure assembly 36 in the longitudinally downwards direction, as viewed in FIG. 1. Fluid at the inlet pressure within the flow chamber 12 also bears on the free or distal end surfaces of the sleeve assembly 80, urging the sleeve assembly 80 and the entire closure assembly 36 longitudinally upwards, as viewed in FIG. 1. The net force acting on the sleeve assembly 80 and urging the closure assembly 36 and its direction depends upon the ratio of the surface area of the shoulder 200 within the first chamber 24 and the surface area of the end surfaces of the sleeve assembly 80 within the flow chamber 12. The balancing of the closure assembly with respect to the inlet fluid pressure may thus be achieved by appropriate sizing of the shoulder 200 with respect to the end surface of the sleeve assembly 80. The arrangement allows for this sizing to be achieved by varying the diameter of the piston 68.

The sleeve assembly 80 has an inner diameter Ds shown in FIG. 1. Similarly, the piston 68 has an outer diameter Dp shown in FIG. 1. In the arrangement that Dp is less than Ds, the surface area of the shoulder 200 within the first chamber 24 is greater than the surface area of the end surface of the sleeve assembly 80. In such a case, the closure assembly 36 is biased into the fully closed position by the inlet fluid pressure. Similarly, with Dp greater than Ds, the surface area of the shoulder 200 is less than the area of the free end surface of the sleeve assembly 80, thus having the closure assembly biased into the fully open position by the inlet fluid pressure. With Dp equal to Ds, the closure assembly is neutrally biased or balanced with respect to the inlet fluid pressure.

As described above, ports 66 and 74 ensure that the second chamber 26 in the upper housing 6 is in fluid communication with fluid within the bore of the cage 50, that is fluid at the outlet pressure. Fluid pressure in the second chamber 26 bears on the upper or exposed end of the piston 38, having a diameter Dp, urging the piston and closure assembly longitudinally downwards, as viewed in FIG. 1, into the fully closed position. Fluid within the cage 50 bears upon the exposed or distal end surface of the plug 60 and on the underside of the balancing bore 74 having a diameter Ds, urging the plug and closure assembly 36 longitudinally upwards, as viewed in FIG. 1. The net force acting on the closure assembly 36 by the fluid at outlet pressure and its direction is determined by the ratio of the surface areas between Dp and Ds, the area under the balancing bore 74, and the distal end of the plug 60. In the arrangement shown, the net effect of the fluid at the outlet pressure acting within the cage 50 and within the second chamber 26 is to neutralize the forces on the assembly 36.

The assembly of FIG. 1 may be arranged to have the closure assembly 36 balanced by the fluid pressures such that there are no net forces acting to urge the closure assembly 36 into either the fully open or fully closed position by either the inlet pressure or the outlet pressure. In this arrangement, the actuator assembly 30 is required to perform the least work to move the closure assembly and operate the valve assembly. Alternatively, the closure assembly may be sized to have the net fluid pressure bias the closure assembly into the fully open or fully closed position. Thus, the assembly may be provided as 'fail safe open' or 'fail safe closed', as required. While this may be preferred and required for certain operations, the biasing applied to the closure assembly by the fluid pressures will need to be overcome by the actuator assembly, during operation. This will likely increase the load on the actuator assembly and, in the case of high pressure fluids, require a more powerful actuator assembly to be employed.

Figure 15:
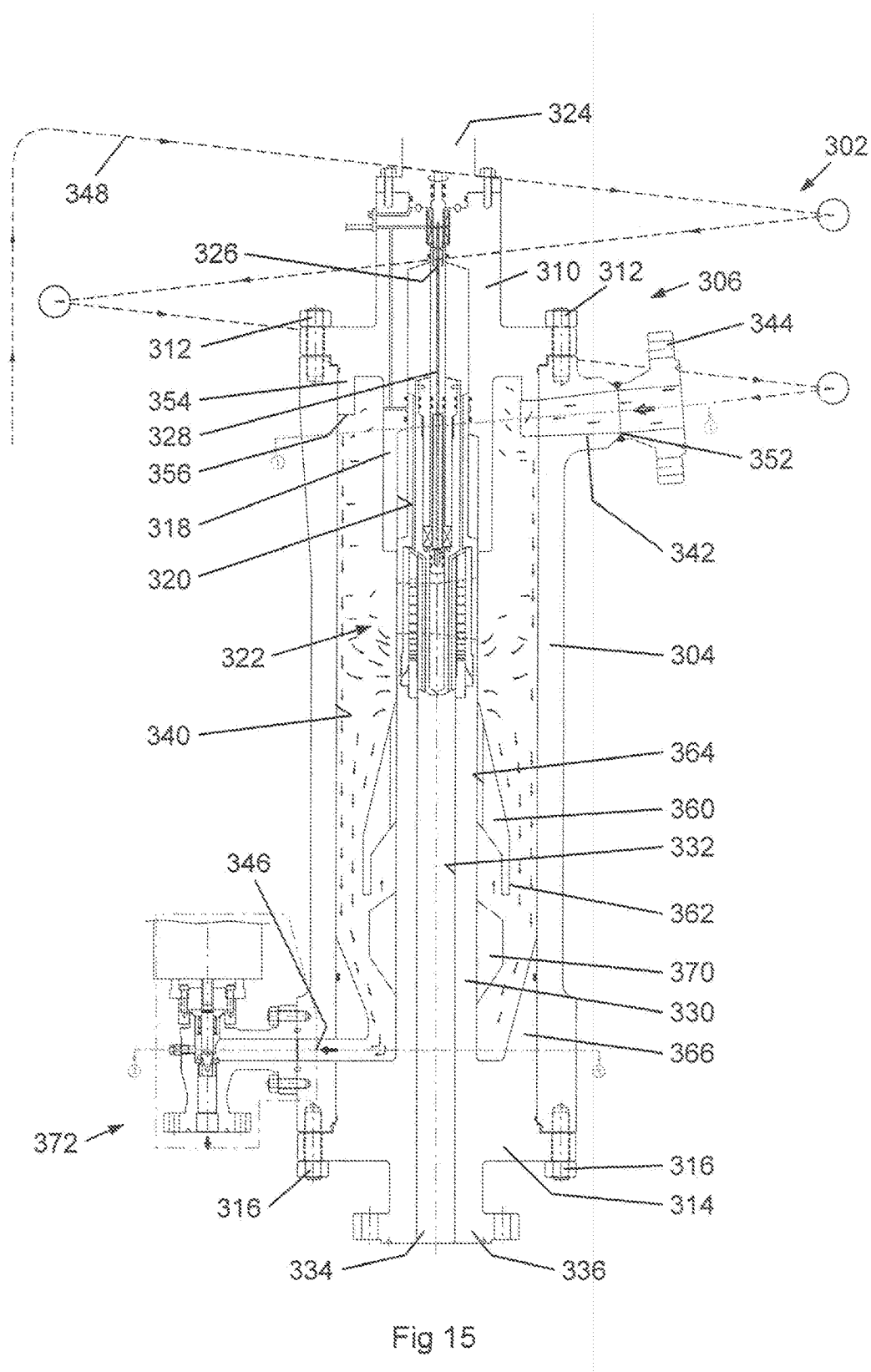
FIG. 15 is a cross-sectional view of an assembly according to a second embodiment of the present invention.

Finally, turning to FIG. 15, there is shown a second embodiment of a valve assembly according to the present invention, in which both fluid pressure control plus fluid separation may be accomplished. In particular, the pressure control assembly described above, comprising a cage and a closure assembly having a plug extending within the cage and a sleeve assembly extending around the cage, may be employed to advantage in a choke assembly to control the pressure/flow of a multiphase fluid stream.

Referring to FIG. 15, there is shown a choke assembly, generally indicated as 302. The choke assembly comprises a generally cylindrical housing 304 having an inlet end, generally indicated as 306, and an outlet end, generally indicated as 308. A first cap 310 is mounted on the housing 304 by bolts 312 to enclose the inlet end 306. A second cap 314 is mounted on the housing 304 by bolts 316 to enclose the outlet end of the housing. The first and second caps 314, 316 are formed to provide several additional functions, as follows:

The first cap 310 has a central mandrel 318 extending therefrom coaxially within the housing 304, the distal end of the mandrel 318 being formed with a cylindrical recess 320 to provide a housing and support for the upper portion (as viewed in FIG. 15) of a choke element, generally indicated as 322. The choke element comprises a flow control assembly as described hereinbefore and shown in FIGS. 1 and 2, for example. An actuator 324 is mounted to the exterior of the first cap 310 in conventional manner. The first cap 310 and mandrel 318 are provided with a central longitudinal bore 326, extending from the actuator 324 to the cylindrical recess 320, through which extends an actuator stem 328. The actuator stem 328 is connected to the plug of the choke element 322 in the manner hereinbefore described, and provides means for the actuator 324 to move the plug longitudinally within the choke cage by rotation of the actuator stem 328. The second cap 314 has a central mandrel 330 extending therefrom coaxially within the housing 304, the distal end of the mandrel 330 being formed to support the lower portion (as viewed in FIG. 15) of the choke element 322. The central mandrel 330 and second cap 314 have a large bore 332 extending longitudinally therethrough. At its inner end, the bore 332 opens into the central cavity within the choke element. At its outer end, the bore 332 extends through an outlet port 334 formed on the exterior of the second cap 314, terminating in a flange 336 of conventional design. In this way, the bore 332 provides a conduit for fluid passing through the choke element 322 to leave the choke assembly 302.

As will be seen in FIG. 15, the mandrels 318, 330 and the choke element 322, together with the inner surface of the housing 304, define a generally annular cavity which, in operation, serves as a separation chamber 340. An inlet nozzle 342 for fluid to be processed is provided in the inlet end 306 of the housing 304, terminating in a flange 344 of conventional design. The housing is provided with an outlet 346 for fluid extending through the housing wall adjacent the second cap 314 at the outlet end 308. The details of the separation chamber 340, the inlet nozzle 342 and the outlet 346 will now be described in more detail.

A fluid inlet assembly 348 is connected to the inlet nozzle 342 by way of the flange 344, the general arrangement of which is shown in dotted lines in FIG. 15. The inlet assembly 348 comprises a helically extending pipe, with the pipe being angled to allow solid material to move along the pipe towards the inlet aided by gravity. The angle of the pipe will be determined by that required to ensure movement of the solids content of the fluid stream being processed. Typically, the pipe will be at an angle of from 5 to 25°, more preferably about 10°. In operation, the inlet assembly provides a pre-conditioning for the multiphase fluid stream being processed. The flow of fluid through the helical path within the pipe causes separation of the heavier and lighter phases in the stream to begin, with the heavier phases collecting at the radially outer region of the pipe bore and the lighter phases moving towards the radially inner region of the pipe bore.

The inlet assembly 348 is arranged such that fluid entering the separation chamber 340 through the inlet nozzle 342 is correctly oriented with respect to the fluid within the separation chamber. The incoming fluid is oriented to have the heavier phases introduced adjacent the inner wall of the housing 304 and the lighter phases introduced towards the central longitudinal axis of the housing 304.

The components at the inlet end 306 of the choke assembly 302 are arranged to create a descending helical flow pattern for the fluid within the separation chamber 340. The inlet nozzle 342 is arranged to open tangentially into the separation chamber 340. The inlet nozzle 342 has a rectangular bore 352 inclined at an angle to the longitudinal axis of the housing 304 of about 85°, that is an angle of 5° from normal to the longitudinal axis of the housing. Other angles of entry may be used, depending upon the nature of the fluid stream to be processed and the overall geometry of the separation chamber 340. The angle of entry may, for example, range from 0 to 25°. This angled entry ensures that fluid entering the separation chamber is caused to follow a helical path downstream within the separation chamber 340, that is downwards, as viewed in FIG. 15. The angle of entry is selected to ensure that the incoming fluid is not brought into direct contact with the rotating fluid already in the separation chamber, but rather that the entering fluid, upon completing one revolution within the separation chamber 340 is caused to pass downstream of the inlet bore 352 (that is below the inlet bore 352, as viewed in FIG. 15). To further assist with establishing the helical fluid flow pattern and to reduce contact between the incoming fluid and fluid rotating within the separation chamber, the end cap 310 is formed with a projection 354 extending along the wall of the housing adjacent the inlet nozzle 342. The projection 354 presents a helical surface 356 to the incoming fluid, forcing the fluid to flow in a helical path within the separation chamber 340. The general form of the helical surface 356 is known in the art and described in GB 2353236A, for example.

It will be noted from FIG. 15 that the inlet bore 352 opens into the separation chamber at a distance from the end cap 310. This provides a volume of the separation chamber between the inlet bore 352 and the end cap 310. This volume is of use when processing a fluid stream containing gas and permits the formation of a gas cap in the separation chamber 340 during operation, as will be described hereinafter.

The separation chamber 340 comprises two outlets for fluid. First, fluid may leave the separation chamber through the choke element 322, as will be described hereinafter. Fluid that does not exit through the choke element 322 is removed from the separation chamber 340 through the outlet 346. In the region of the separation chamber 340 downstream of the choke element 322, that is between the choke element and the outlet 346, the choke assembly 302 is provided with features to encourage further fluid phase separation. The choke assembly 302 is configured to reduce the cross-sectional area of flow available within the separation chamber as fluid approaches the outlet 346.

This may be achieved in a number of ways. Referring to FIG. 15, a frusto-conical flow guide 360 is disposed around the central mandrel 330 in the region downstream of the choke element. The effect of the flow guide 360 is to reduce the cross-sectional area available for the flow of fluids in the annular cavity between the mandrel 330 and the inner wall of the housing 304. A generally cylindrical skirt 362 extends in the downstream direction from the downstream end of the flow guide 360. A plurality of longitudinal conduits 364 extend through the flow guide adjacent the mandrel 330 and serve to connect the region of the separation chamber 340 downstream of the flow guide with the upstream region. Conduits 364 allow an upward circulation of separated central zone fluid while rotating. Partially separated fluid can descend between the flow guide 360 and the inner wall of the housing 304.

As an alternative or in addition to the frusto-conical flow guide 360, the housing 304 may be provided with a conical or tapered form in the region of the separation chamber 340 immediately downstream of the choke element 322.

Downstream of the flow guide 360 and adjacent the outlet 346, the cross-sectional area of the separation chamber 340 is further reduced by a tapered flow guide 366, extending upwards (as viewed in FIG. 15) within the housing 304 from the second cap 314. An alternative to the tapered flow guide 366 of FIG. 15 is to form the mandrel 330 with a tapered section in the region adjacent the end cap 314 and the outlet 346, such that the cross-sectional area of the separation chamber 340 reduces in the downstream direction along the tapered section.

Downstream of the flow guide 360, the choke assembly 302 is provided with a plurality of vanes 370 extending longitudinally along the mandrel 330. The vanes 370 act to inhibit the rotation of the fluid in the central zone within the adjacent region of the separation chamber. In this region, it is preferred to maintain some rotational components to the fluid flow, in order to maintain the fluid in an agitated state, for example to ensure entrained solids are kept in suspension.

The flow of the fluid stream leaving the separation chamber 340 through the outlet 346 is controlled by a flow control assembly 372, of conventional design.

In operation, the choke assembly of FIG. 15 functions as follows:

The operation of the choke assembly will be described having reference to a multiphase fluid stream comprising gas, oil, water and entrained solid particles, typical of a fluid stream produced from a subterranean well. In this fluid stream, the lightest fluid phase is the gas. Of the liquid phases, oil is the lighter phase and water is the heavier phase. The solid material, as it is entrained in the fluid, will behave as the heaviest fluid stream. It will be understood that this fluid stream is merely exemplary of the fluid streams that can be processed using the choke assembly of this invention and the scope of the present invention is not to be limited to such fluid streams.

The fluid stream is introduced into the inlet end 306 of the separation chamber 340 through the inlet bore 352 of the inlet nozzle 342 from the inlet assembly 348. The action of the inlet assembly 348 has been to precondition the fluid stream and initiate separation of the fluid phases. The fluid is introduced into the separation chamber 340, such that the water and entrained solids are concentrated at the inner wall of the housing 304, with oil and gas being introduced into the separation chamber 340 at some distance from the wall. This orientation of the fluid phases matches that assumed by the various phases within the separation chamber 340. The effect of the angle of entry of the fluid and the helical fluid guide surface 356 is to cause the fluid to flow in a helical pattern, moving generally downstream in the separation chamber 340. The gas separates from the liquid phases and forms a central gas core, stabilized by a gas cap formed in the inlet end 306 of the separation chamber 340 above (as viewed in FIG. 15) the inlet 352 and adjacent the end cap 310. A gas/liquid interface will form within the separation chamber 340, with the liquid phases forming a lining around the wall of the separation chamber 340, surrounding a gaseous core. The interface will have a generally 'bowl' shape. Within the liquid phases, oil will collect in the region adjacent the gas/liquid interface, while water and entrained solids will concentrate and migrate to the radially outer region of the separation chamber 340 adjacent the inner wall of the housing 304. The action of maintaining a gaseous core within the liquid 'bowl', prevents liquids and entrained solids from collecting in the central region of the separation chamber. This in turn requires the liquids and entrained solids to collect in the radially outer region, adjacent the wall of the separation chamber, where they are subjected to higher centrifugal forces, further enhancing separation of the phases.

The choke element 322 is located within the separation chamber 340 such that the gas/liquid interface intersects the choke cage, allowing the lighter fluid phases, in particular gas and oil, to leave the separation chamber through the choke element. Some water and solid particles may be entrained with the gas, oil and water stream and leave through the choke element. However, a portion of the water with a concentration of solid material remains in the separation chamber 340. The fluid stream passing through the choke element 322 enters the bore 332 in the mandrel 330 and leaves the choke assembly 302 through the outlet 334 in the end cap 314. Alternatively, the arrangement and orientation of the apertures in the cage of the choke element 322 can be used as a flow control device, as described hereinbefore and shown in the accompanying figures, ensures that the fluid stream passing into through the choke element is subjected to minimal shear. In particular, as hereinbefore described, the fluid jets formed as the fluid passes through the apertures in the cage are directed in a helically downwards pattern (as viewed in FIG. 5), such that collisions between adjacent fluid jets are reduced or eliminated. This in turn maintains the separation of fluid phases that has been induced in the inlet assembly and within the choke assembly around the choke element 322.

The heavier fluid phases, in particular water and entrained solids pass downstream of the choke element 322 and pass the conical flow guide 360. The decreasing cross-sectional area within the separation chamber 340 as the fluid flows downstream causes the density of solids to increase in the fluid phase and to be concentrated near the wall of the separation chamber 340, where they are subjected to a high centrifugal effect due to rotation of the fluid. The skirt 362 extending from the flow guide 360 provides a calm region immediately downstream of the flow guide 360. Lighter fluids, in particular gas and oil, entrained with the water and solids collect beneath (as viewed in FIG. 15) the flow guide 360 and separated fluid flows upwards through the conduits 364 to pass into the cage and through the choke element 322. Rotation of the water/solid mixture downstream of the flow guide 360 is damped by the vanes 370, allowing the separation of lighter and heavier fluid phases and solid material to occur through a combined rotation and gravity separation regime. Water and solid material are withdrawn from the separation chamber 340 through the outlet 346, under the control of the flow control assembly 372.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A valve assembly comprising:
   a valve housing having a wall that defines a cavity and a channel in the form of an involute, wherein the channel is recessed into a surface of the wall that defines the cavity;
   an inlet for fluid entering the valve housing;
   an outlet for fluid leaving the valve housing;
   a flow control assembly disposed within the cavity of the valve housing between the inlet and the outlet, whereby fluid entering the valve housing is caused to flow through the flow control assembly, the flow control assembly comprising:
   a cage having apertures therethrough to provide passage for fluid passing from the inlet to the outlet;
   a closure assembly comprising:
      a first closure member disposed within the cage and moveable with respect to the cage between a first closed position, in which the first closure member closes an innermost end of all of the apertures in the cage, and a second open position, in which the innermost end of all the apertures in the cage are open; and
      a second closure member disposed outside the cage and moveable with respect to the cage between a first closed position, in which the second closure member closes the outermost end of all of the apertures in the cage, and a second open position, in which the outermost end of all the apertures in the cage are open
   wherein a cross-sectional width of the channel tapers from the inlet in a direction about a circumference of the wall, and wherein the channel is configured to gradually direct the fluid towards the flow control assembly.

2. The valve assembly according to claim 1, wherein all the fluid entering the valve housing through the inlet is caused to flow through the flow control assembly to the outlet.

3. The valve assembly according to claim 1, wherein the valve housing comprises the cavity therein, the flow control assembly being disposed within the cavity, such that the cavity extends around the flow control assembly.

4. The valve assembly according to claim 3, wherein the inlet extends at an angle to a radial direction within the cavity, such that fluid entering the cavity is not caused to impinge directly onto the flow control assembly.

5. The valve assembly according to claim 4, wherein the inlet is arranged in the valve housing to extend tangentially to the wall of the cavity, such that, in use, fluid is caused to enter the cavity along the circumferential wall of the cavity.

6. The valve assembly according to claim 5, wherein the cavity comprises the channel extending circumferentially its wall extending around the flow control assembly, in use the inlet directing an incoming fluid stream into the channel.

7. The valve assembly according to claim 6, wherein the channel has a form of an involute.

8. The valve assembly according to claim 7, wherein the channel has a progressively smaller cross-sectional area travelling in a direction of flow of fluid in the channel.

9. The valve assembly according to claim 1, wherein the apertures are arranged in the cage in a plurality of rows, each row containing at least one aperture, adjacent rows being separated by a land having no apertures therethrough.

10. The valve assembly according to claim 9, wherein the adjacent apertures in adjacent rows are offset circumferentially from one another around an exterior of the cage.

11. The valve assembly according to claim 10, wherein the adjacent apertures in adjacent rows extend in a helical pattern along and around the cage.

12. The valve assembly according to claim 1, wherein the apertures extend through the wall of the cage at an angle to a radial direction in a plane perpendicular to a longitudinal axis of the cage.

13. The valve assembly according to claim 12, wherein the apertures open tangentially to an interior surface of the cage.

14. The valve assembly according to claim 1, wherein the apertures extend at an angle to a plane perpendicular to a longitudinal axis, in a longitudinal direction of flow of fluid within the cage.

15. The valve assembly according to claim 14, wherein the apertures are angled such that, in use, a fluid jet entering the cage from one aperture does not contact the fluid jet entering the cage through an adjacent aperture in a direction of flow of fluid within the cage.

16. The valve assembly according to claim 1, wherein the first and second closure members are moveable together with respect to the cage, wherein the first and second closure members are connected together and are moveable by a single actuator assembly.

17. The valve assembly according to claim 16, wherein the first and second closure members both extend from a single support member, wherein the support member is a piston moveable longitudinally within a chamber.

18. The valve assembly according to claim 1, wherein the first and second closure members are of a different size, such that the number of apertures closed by the first closure member in a given position may be different to the number of apertures closed by the second closure member when in the given position.

19. The valve assembly according to claim 18, wherein as the first and second closure members are moved from the first, closed position, one of the first or second closure members opens apertures before the other of the first and second closure members.

20. The valve assembly according to claim 1, wherein the first closure member is longer in a longitudinal direction of the cage than the second closure member.

21. The valve assembly according to claim 1, wherein at least one of the first and second closure members is provided with a sealing surface to engage with a seat in the first closed position.

22. The valve assembly according to claim 21, wherein the seat is displaced from the apertures of the cage, such that in use the seat is outside a direct flow path of fluid passing through the apertures in the cage.

23. The valve assembly according to claim 21, wherein the seat is self-sharpening.

24. The valve assembly according to claim 21, wherein the seat is provided with a sealing surface extending at an acute angle to a longitudinal axis of the cage.

25. The valve assembly according to claim 21, wherein an end portion of the second closure member is formed with a compound surface comprising two surface portions extending at an obtuse angle to one another to define a ridge, the ridge contacting the seat when the second closure member is in the first, closed position.

26. A valve assembly comprising:
a valve housing having a wall that defines a cavity and a channel in the form of an involute, wherein the channel is recessed into a surface of the wall that defines the cavity;
an inlet for fluid entering the valve housing;
an outlet for fluid leaving the valve housing;
a flow control assembly disposed within the cavity of the valve housing between the inlet and the outlet, whereby fluid entering the valve housing is caused to flow through the flow control assembly, the flow control assembly comprising:
a cage having apertures therethrough to provide passage for fluid passing from the inlet to the outlet, wherein the apertures in the cage are angled toward the outlet;
a closure member moveable with respect to the cage between a first closed position, in which the closure member closes all of the apertures in the cage, and a second open position, in which all the apertures in the cage are open; and
wherein a cross-sectional width of the channel tapers from the inlet in a direction about a circumference of the wall, and wherein the channel is configured to gradually direct the fluid towards the flow control assembly.

27. The valve assembly according to claim 26, wherein the inlet is arranged in the valve housing to extend tangentially to the wall defining the cavity, such that, in use, fluid is caused to enter the cavity circumferentially along the wall.

28. The valve assembly according to claim 27, wherein the cavity comprises a channel extending circumferentially its wall extending around the flow control assembly, in use the inlet directing an incoming fluid stream into the channel.

29. The valve assembly according to claim 28, wherein the channel has a form of an involute.

30. The valve assembly according to claim 29, wherein the channel has a progressively smaller cross-sectional area travelling in a direction of flow of fluid in the channel.

31. An apparatus, comprising:
a valve housing having a wall that defines a cavity and a channel in the form of an involute, wherein the channel is recessed into a surface of the wall that defines the cavity;
an inlet for fluid entering the valve housing;
an outlet for fluid leaving the valve housing;

a flow control assembly, the flow control assembly comprising:
  a cage having apertures therethrough to provide passage for fluid passing from the inlet to the outlet;
  a closure assembly configured to open and close the apertures in the cage; and
  wherein a cross-sectional width of the channel tapers from the inlet in a direction about a circumference of the wall, and wherein the channel is configured to gradually direct the fluid towards the flow control assembly.

* * * * *